(12) United States Patent
Schoen et al.

(10) Patent No.: US 8,595,033 B1
(45) Date of Patent: Nov. 26, 2013

(54) APPARATUS, ARTICLE, AND METHOD FOR CLASSES OF OWNERSHIP INTERESTS

(75) Inventors: Matthew B. Schoen, Ojai, CA (US);
Wayne F. Perg, Sierra Vista, AZ (US);
John Andrew Pfleger, Miami, FL (US)

(73) Assignee: Concept Hedging, LLC, Miami, FL (US)

( * ) Notice: Subject to any disclaimer, the term of this patent is extended or adjusted under 35 U.S.C. 154(b) by 0 days.

(21) Appl. No.: 12/850,576

(22) Filed: Aug. 4, 2010

Related U.S. Application Data

(60) Provisional application No. 61/231,164, filed on Aug. 4, 2009.

(51) Int. Cl.
*G06Q 40/00* (2012.01)

(52) U.S. Cl.
USPC .................................. 705/4; 705/35

(58) Field of Classification Search
USPC .................................. 705/4, 35–45
See application file for complete search history.

(56) References Cited

U.S. PATENT DOCUMENTS

| | | | |
|---|---|---|---|
| 7,895,101 B1* | 2/2011 | Ferguson et al. | 705/35 |
| 2003/0055664 A1* | 3/2003 | Suri | 705/1 |
| 2005/0071263 A1* | 3/2005 | Janssen | 705/35 |
| 2005/0289049 A1* | 12/2005 | Schuver et al. | 705/40 |
| 2008/0082437 A1* | 4/2008 | Co et al. | 705/37 |
| 2008/0249809 A1* | 10/2008 | Rosen et al. | 705/4 |
| 2009/0164384 A1* | 6/2009 | Hellen et al. | 705/36 R |

OTHER PUBLICATIONS

Post #2 by JanetM, BenefitsLink.com, Jul. 17 2007, http://benefitslink.com/boards/index.php?showtopic=36149.*

* cited by examiner

*Primary Examiner* — Jason M Borlinghaus
*Assistant Examiner* — Hao Fu
(74) *Attorney, Agent, or Firm* — Peter K. Trzyna, Esq.

(57) ABSTRACT

A method, machine, article for classes of ownership interests. A method can include: storing in memory data specifying an agreement by which a first class of ownership interest is obligated to pay consideration to at least one other class of ownership interest in exchange for the at least one other class of ownership interest incurring risk exposure to at least one specified risk associated with the first class of ownership interest and whereby realizing a loss associated with the risk exposure is contingent upon occurrence of at least one specified event; determining, by a digital computer accessing the memory and receiving market data corresponding to an investment associated with the first class of ownership interest, an amount of the risk exposure and an amount of the consideration; and outputting, by the computer, at least one of the amounts.

91 Claims, 18 Drawing Sheets

APPARATUS, ARTICLE, AND METHOD FOR CLASSES OF OWNERSHIP INTERESTS

I. PRIORITY STATEMENT

This claims benefit from, and incorporates by reference completely as if restated totally herein, Ser. No. 61/231,164, filed on Aug. 4, 2009.

II. TECHNICAL FIELD

The technical field is process, machine, manufacture, pertaining to computer systems and data processing systems.

III. SUMMARY OF THE INVENTION

Depending on the implementation, there is apparatus, a method for use and method for making, and corresponding products produced thereby, as well as data structures, computer-readable media tangibly embodying program instructions, manufactures, and necessary intermediates of the foregoing, each pertaining to digital aspects of such as: contract values; classes of ownership interests; a specified event bond; a hedged specified event bond; and/or an entity holding insurance.

IV. BRIEF DESCRIPTION OF THE DRAWINGS

Figure 1:
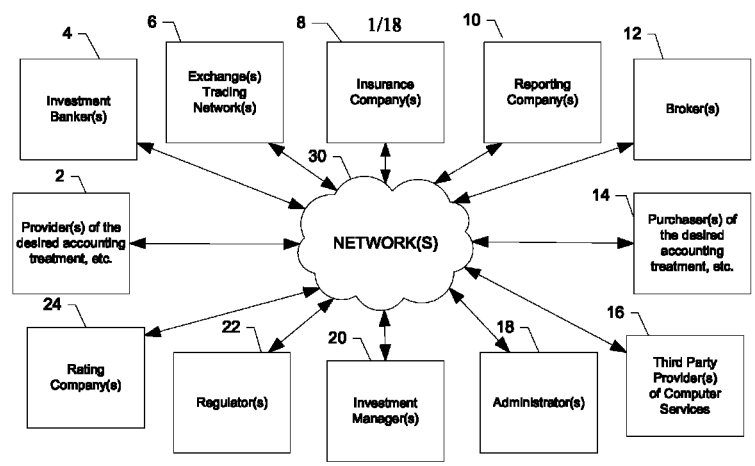
Figure 2:
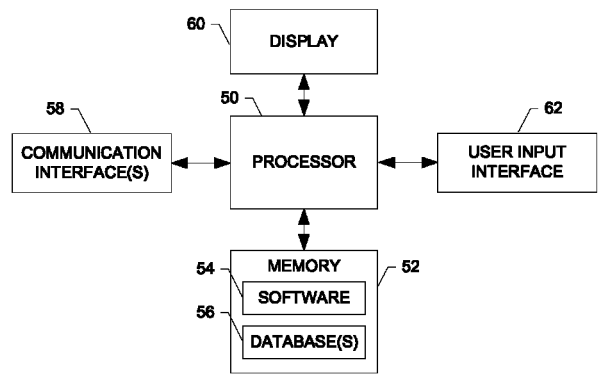
Figure 3:
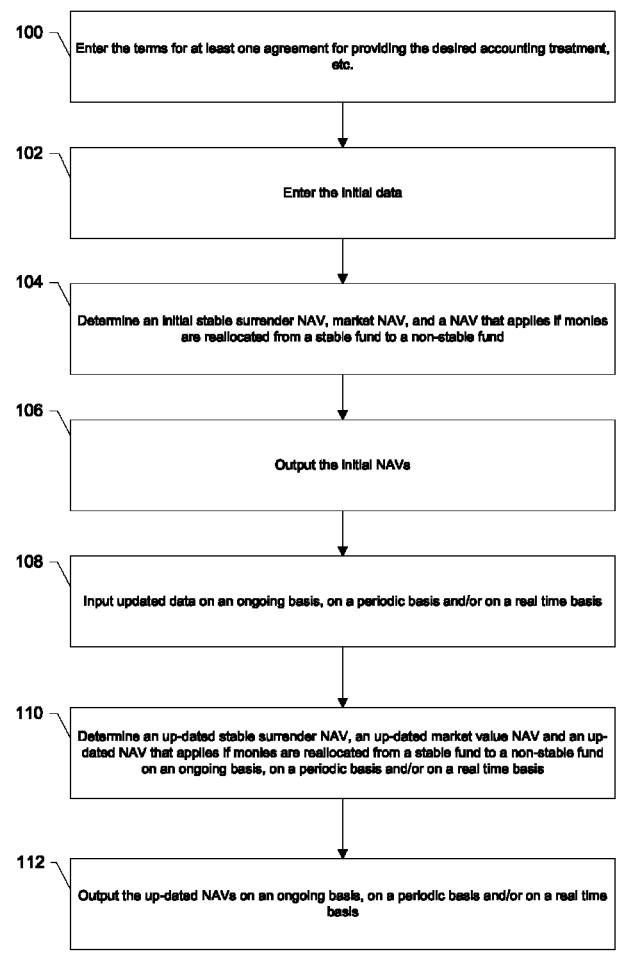
Figure 4:
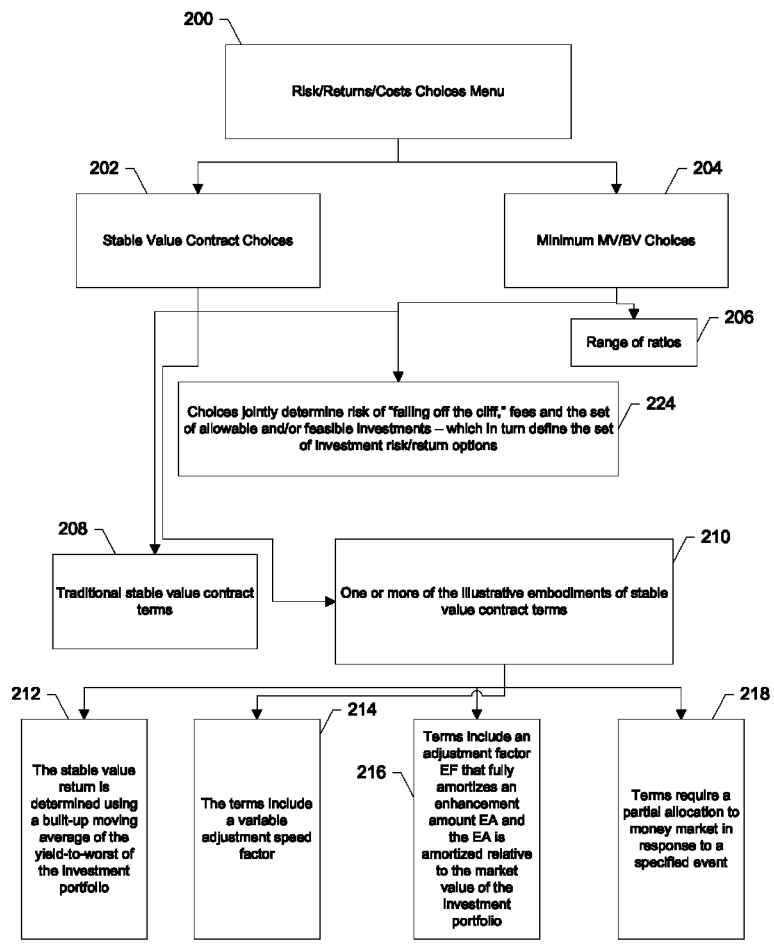
Figure 4A:
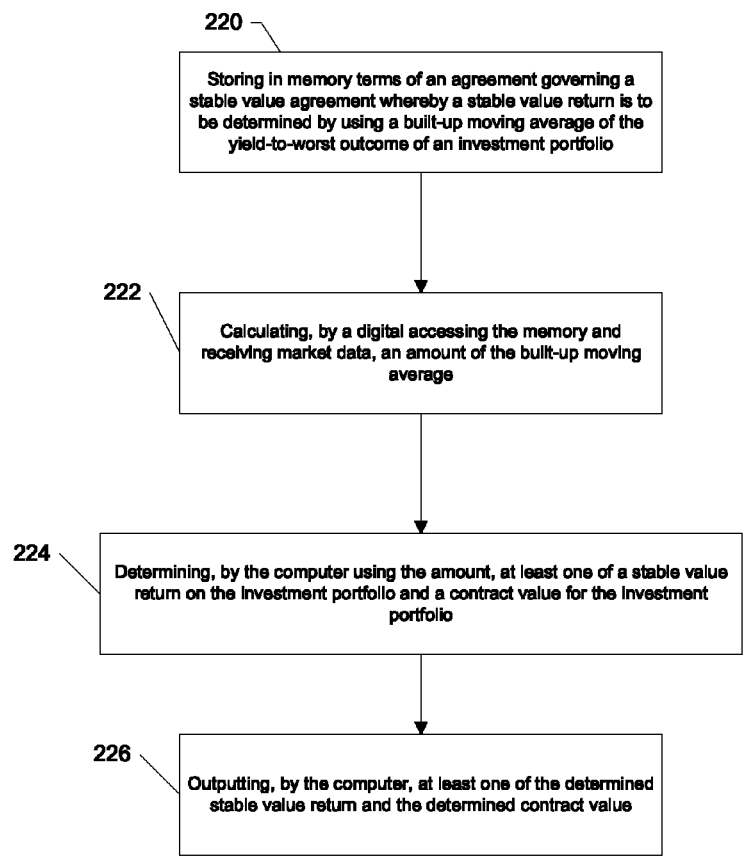
Figure 4B:
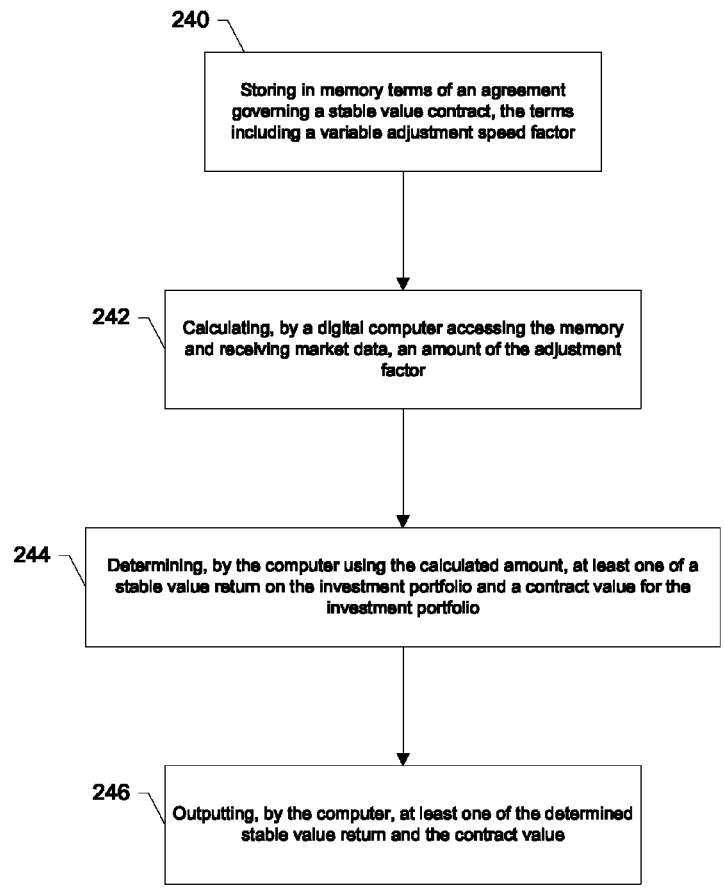
Figure 4C:
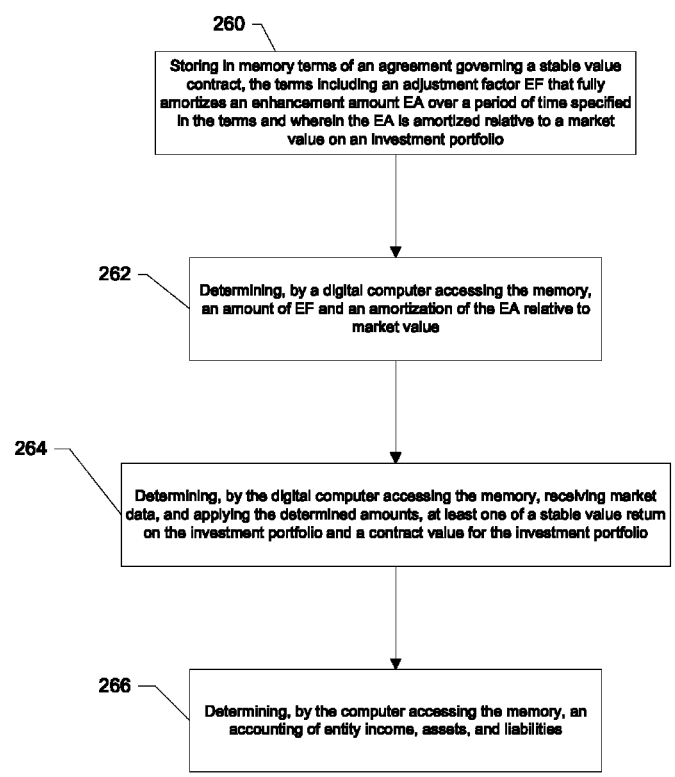
Figure 4D:
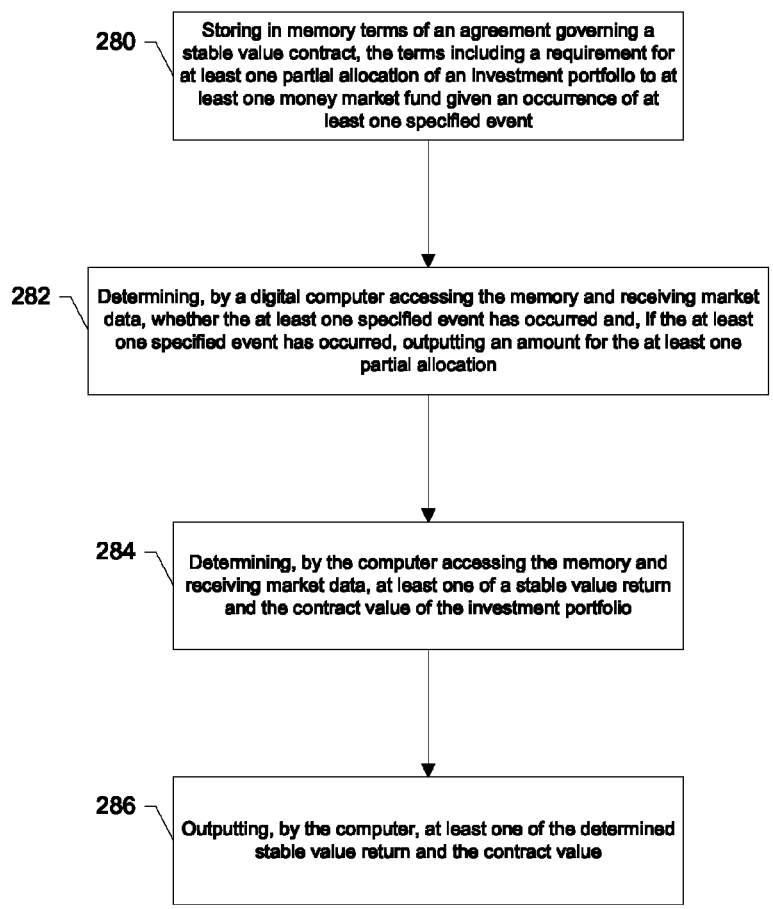
Figure 5:
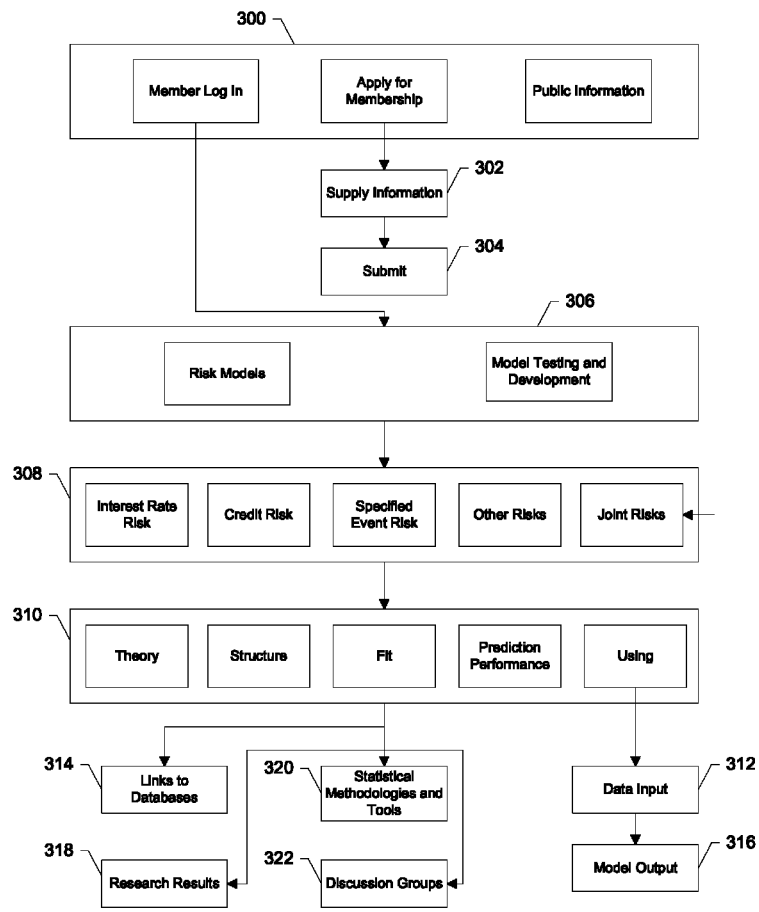
Figure 6:
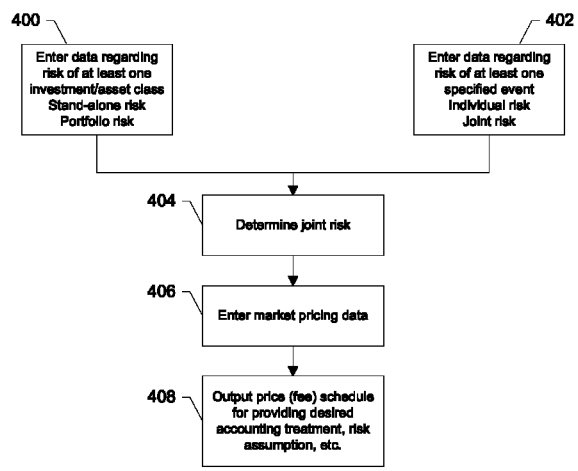
Figure 6A:
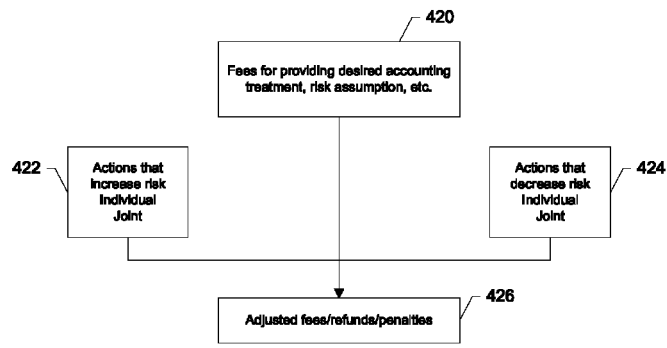
Figure 7:
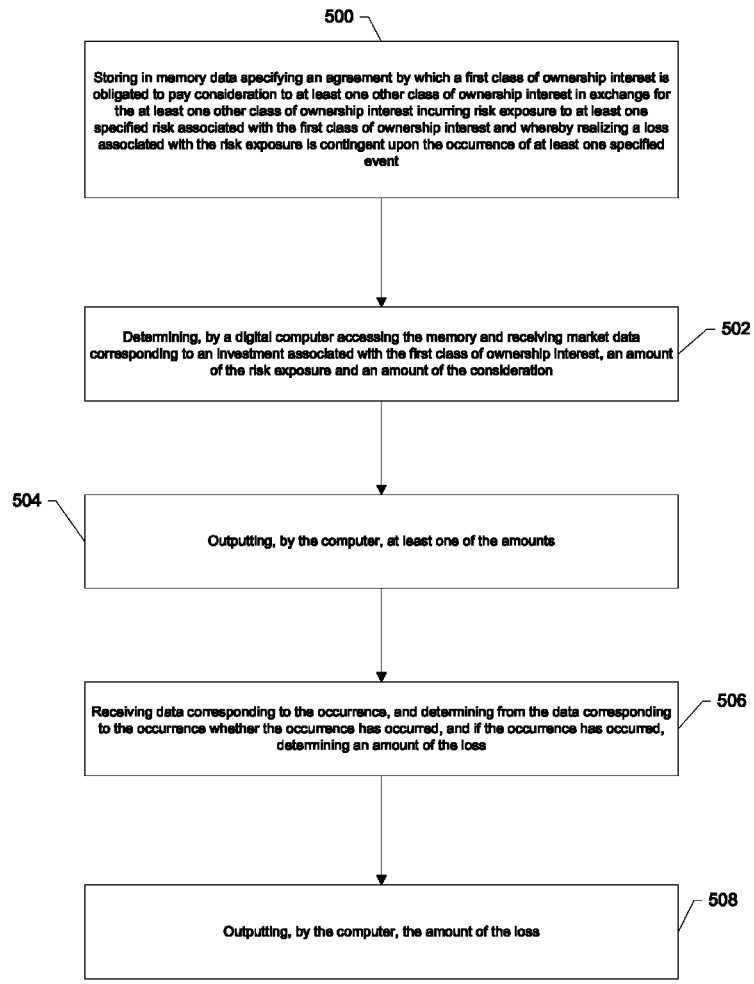
Figure 8:
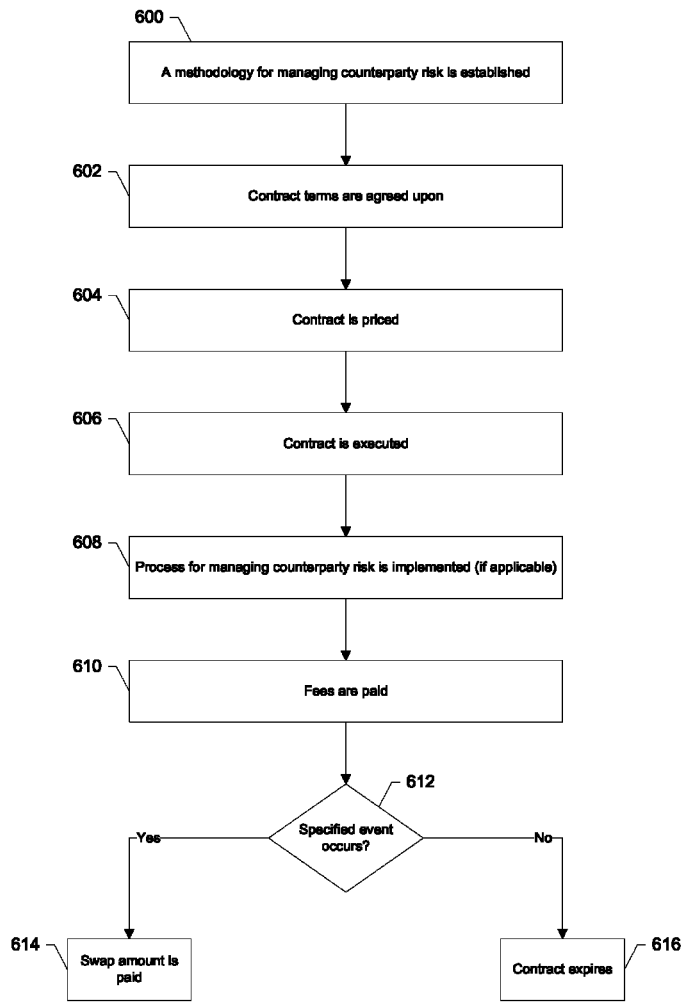
Figure 9:
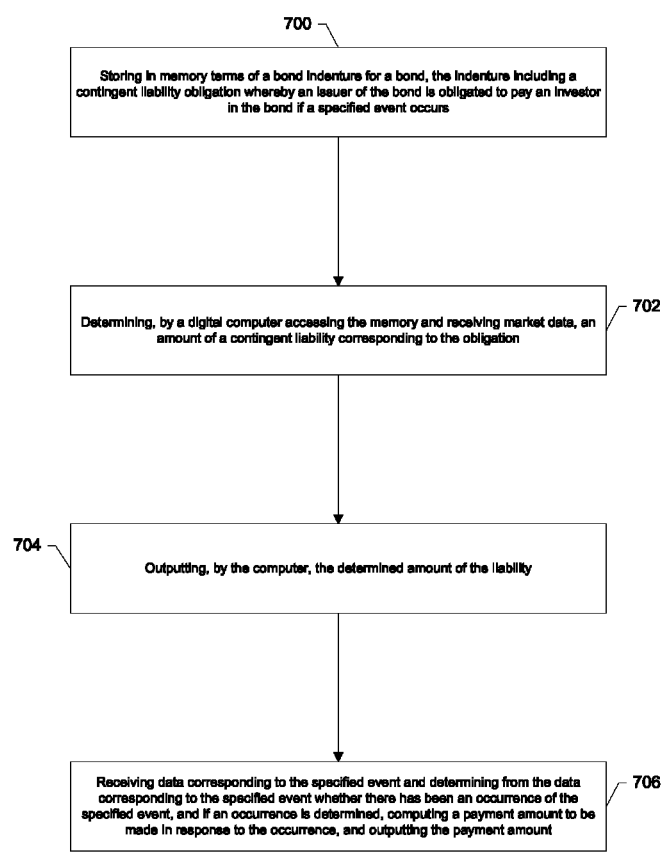
Figure 9A:
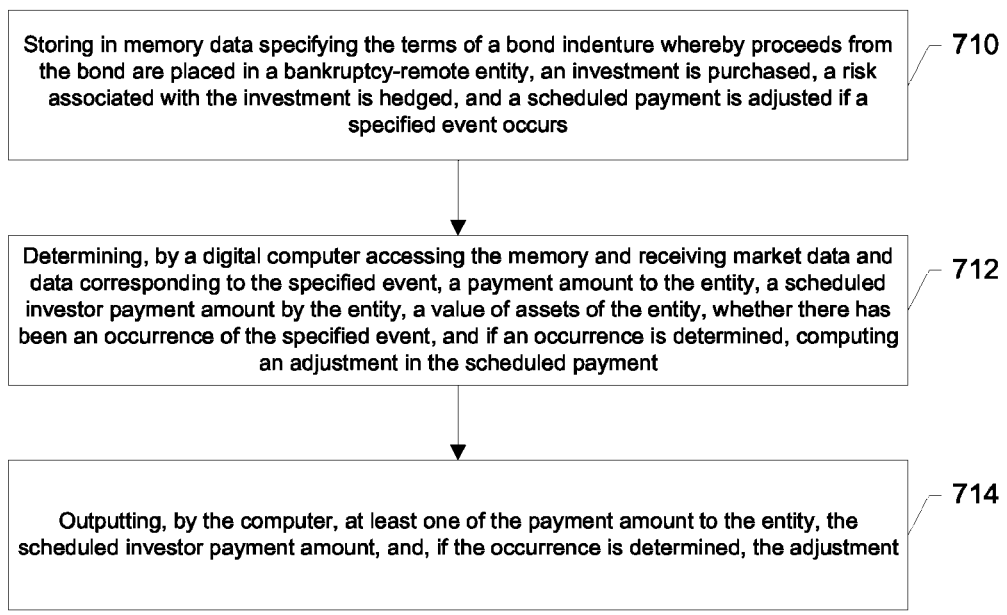
Figure 10:
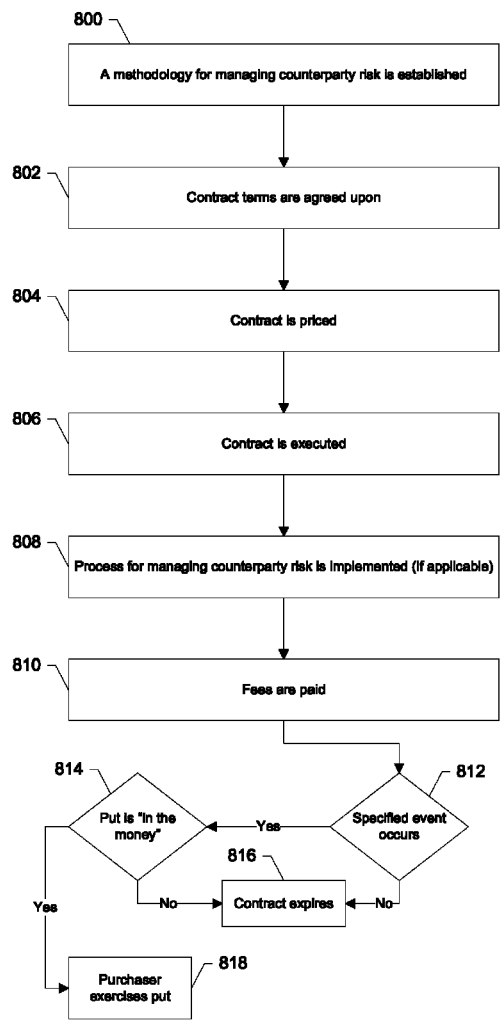
Figure 11:
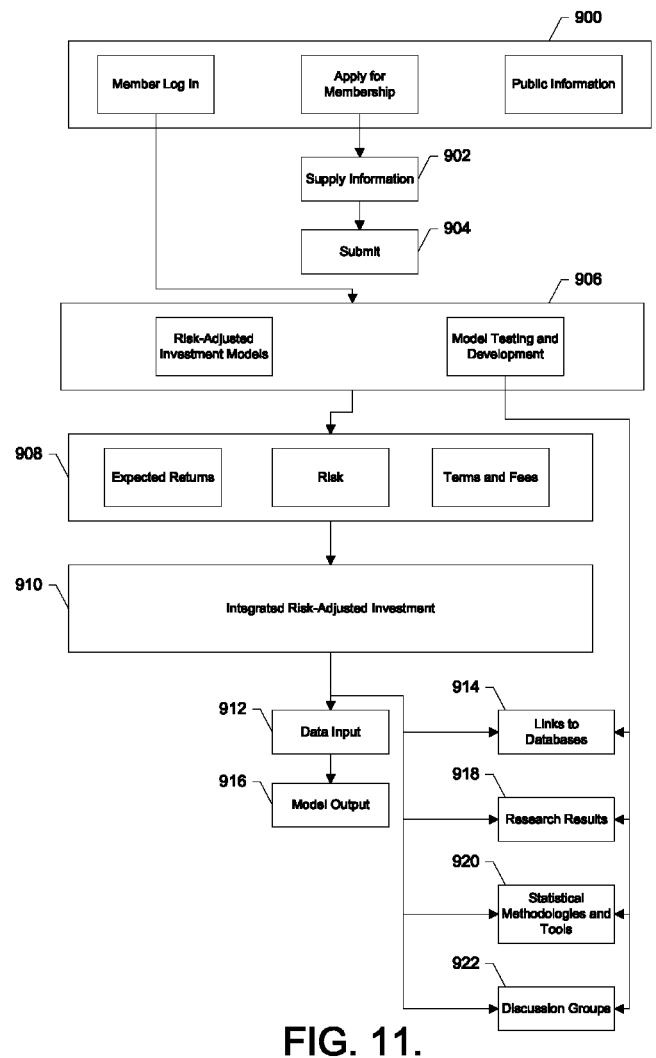
Figure 12:
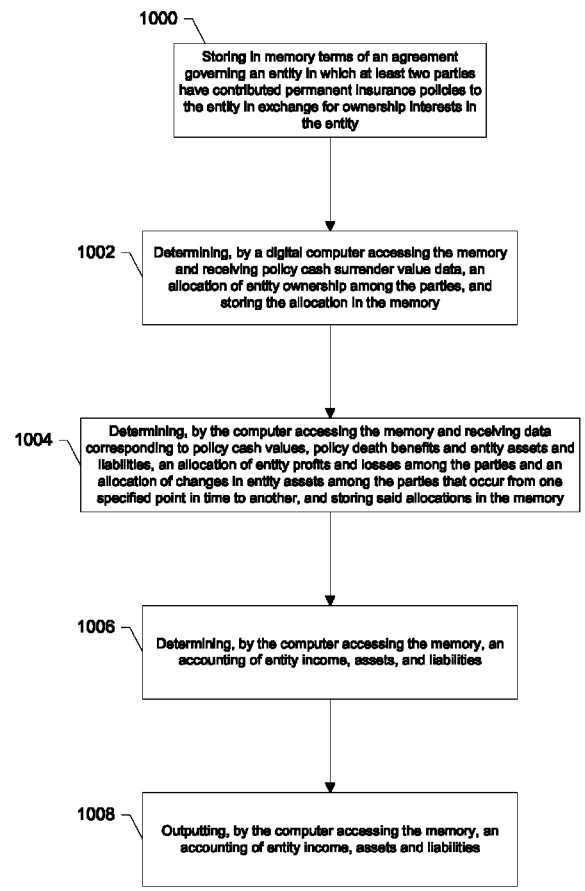
Figure 13:
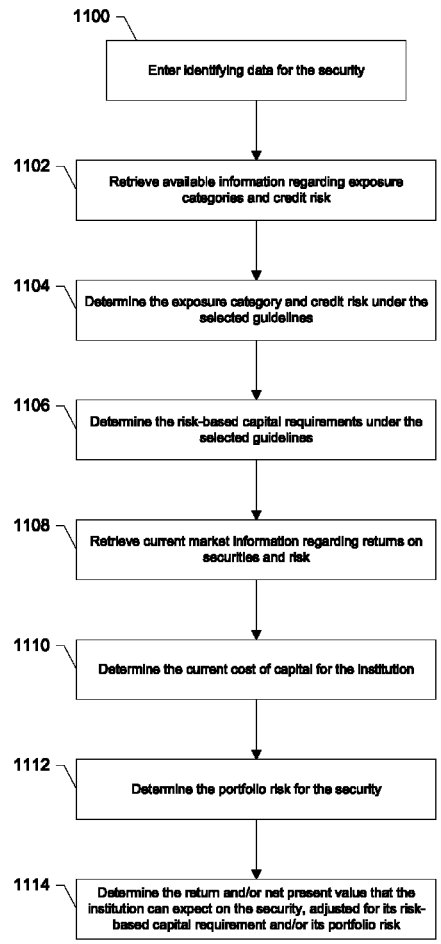
Figure 14:
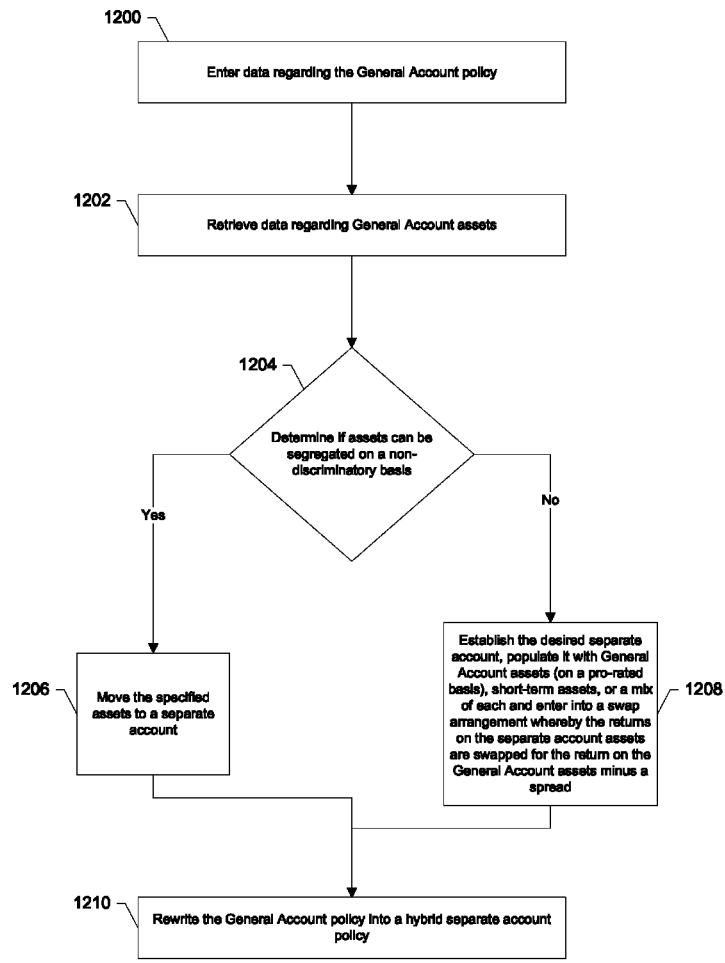

FIG. 1 is an illustration of a system according to an exemplary embodiment.
FIG. 2 is an illustration of an apparatus according to an exemplary embodiment.
FIG. 3 is a flow chart for another exemplary embodiment.
FIG. 4 is a flow chart for another exemplary embodiment.
FIG. 4A is a flow chart for another exemplary embodiment.
FIG. 4B is a flow chart for another exemplary embodiment.
FIG. 4C is a flow chart for another exemplary embodiment.
FIG. 4D is a flow chart for another exemplary embodiment.
FIG. 5 is a flow chart for another exemplary embodiment.
FIG. 6 is a flow chart for another exemplary embodiment.
FIG. 6A is a flow chart for another exemplary embodiment.
FIG. 7 is a flow chart for another exemplary embodiment.
FIG. 8 is a flow chart for another exemplary embodiment.
FIG. 9 is a flow chart for another exemplary embodiment.
FIG. 9A is a flow chart for another exemplary embodiment.
FIG. 10 is a flow chart for another exemplary embodiment.
FIG. 11 is a flow chart for another exemplary embodiment.
FIG. 12 is a flow chart for another exemplary embodiment.
FIG. 13 is a flow chart for another exemplary embodiment.
FIG. 14 is a flow chart for another exemplary embodiment.

V. MODES

Embodiments are described hereinafter with reference to the accompanying figures. However, there are many different variations of these embodiments, and this description should not be construed as limited to the embodiments used to provide the overall teaching herefrom. Similarly, the accompanying figures illustrate embodiments intended to illustrate and exemplify in a teaching manner, by way of the prophetic teachings herein. Like numbers, in the text and figures, refer to like elements throughout.

As used herein, the term "computer" generally refers to hardware or hardware in combination with one or more program(s), such as can be implemented in software. Computers can be implemented as general-purpose computers, specialized devices, or a combination of general-purpose and specialized computing devices. Computing devices can be implemented electrically, optically, quantumly, biologically, and/or mechanically or in any combination of these technologies. A computer as used herein can be viewed as at least one computer having all functionality or as multiple computers with functionality separated to collectively cooperate to bring about the functionality. This includes single processor and multi-processor implementations of a computer. A processor can include any device that processes information or executes instructions. Computer logic flow and operations can be used in processing devices, including but not limited to: signal processors, data processors, microprocessors, and communication processors. Logic flow can be implemented in discrete circuits, combinational logic, ASICs, FPGAs, reconfigurable logic, programmed computers, or an equivalent.

Computer-readable media or medium, as used herein, includes any technology that includes a characteristic of memory. Memory technologies can be implemented using magnetic, optical, mechanical, or biological characteristics of materials. Common examples of memory include, but are not limited to, RAM, ROM, PROM, EPROM, FPGA, flash drive(s), and floppy or hard disk(s). Communications medium or connection, as used herein, is any pathway or conduit in which information can be communicated or exchanged. The pathway or conduit can be wired, optical, fluidic, acoustic, wireless, or any combination of the foregoing.

The computer system can include one or more computers, which illustratively can be PC systems or server systems, and any combination of the foregoing. Depending on the implementation, computers can be adapted to communicate among themselves, or over a network such as the Internet. Programs, as used herein, are instructions that when executed by a processing device causes the processor to perform specified operations. Programs can be written in various languages, including but not limited to assembly, COBOL, FORTRAN, BASIC, C, C++, or Java. Languages can be object oriented like C++ and Java, for example. The programming language can be interpretive or compiled, or a combination of both. The programs are usually processed by a computing system having an operating system. An operating system can be processor specific, like an RTOS (real time operating system) used in cell phones, or commercial like OSX, UNIX, Windows, or LINUX. An operating system or program can be hardwired, firmware, reside in memory or be implemented in an FPGA or reconfigurable logic.

For example, a computer system can comprise a computer (e.g., an IBM™, Hewlett Packard™, MAC™, or other personal computer) with one or more processors (e.g., an Intel™ or AMD™ series processor or the like), a memory (e.g., RAM, a hard drive, disk drive, etc.), one or more input devices (e.g., keyboard, mouse, modem, or the like), and one or more output devices (e.g., a modem, a Hewlett Packard™ printer, a Dell™ monitor, or other such output device). Note that the modem is representative of a computer-to-computer communication device that can operate as an input/output device. To provide other illustrative embodiments, the computer system can comprise at least one of a desktop computer, a telephonic device, a console, a laptop computer, and a mobile communication device. The mobile communication device can comprise at least one of a cellular telephone, laptop, a PDA, and an IPhone-type device. Communications between devices may be wired, for example cabled Ethernet based home or office network, wireless through IEEE 802.11a/b/g network cards or Bluetooth™, or optical through an IR port. Networking between devices may be through WANs, LANs, Intranets, Internet or peer-to-peer arrangements, or in a combination of them. Networks may include, for example, gateways, routers, bridges, switches, front end and back end servers, IPS (Internet service providers), content provider servers, scanners, copiers, printers and user computing devices. Devices on the network may include interfaces that can be as simple, such as a keyboard with an LCD screen, or can be complex, such as a web interface. Web interfaces are presented in a web browser environment. Web browsers render XML or HTML containing pictures and links in a window on the desktop, for example like Windows XP™, Firefox™, Mozilla™, Internet Explorer™, and Safari™ are some examples of well known web browsers.

Consider now the figures illustrate so as to teach the broader principles at play.

Referring to FIG. 1, entities (spread out or consolidated in one way or another as may be preferred in any given application) which can cooperate in a digital manner to carry out terms of an agreement. As an overview, particulars can be implemented in a variety of different configurations, so as to carry out the agreement of interest so as to implement improvements to insurance, financial products and assets including at least one of the desired costs, accounting treatment, asset classification, risk management, capital treatment and/or ownership (henceforth "desired accounting treatment, etc."). A configuration such as that in FIG. 1, illustrative of corresponding computers, includes one or more providers of the desired accounting treatment, etc. 2, purchasers of the desired accounting treatment, etc. 14 (policyholders and/or protection buyers), insurance companies 8, investment managers 20, investment bankers 4, exchanges and/or trading networks for securities 6, reporting companies 10 (e.g., Bloomberg, Reuters, etc.), brokers 12 (e.g., securities brokers, insurance brokers, etc.), rating companies 24 (e.g., Standard & Poor, Moody's, Fitch, A. M. Best, etc.), regulators 22 (e.g., SEC, state insurance commissioners, etc.), administrators 18 (e.g., of partnerships or other entities), and/or third party providers of computer services 16 (including so-called "cloud computing" in which the programs and/or data reside on the web).

Each provider of the desired accounting treatment, etc. 2 is digitally configured to directly and/or indirectly communicate with one or more purchasers of the desired accounting treatment, etc. 14 (policy holders and/or protection buyers), insurance companies 8, investment managers 20, investment bankers 4, exchanges and/or trading networks for securities 6, reporting companies 10, brokers 12, rating companies 24, regulators 22, administrators 18, and/or third party providers of computer services 16.

Similarly, each purchaser of the desired accounting treatment, etc. 14 is digitally configured to directly and/or indirectly communicate with one or more providers of the desired accounting treatment, etc. 2, insurance companies 8, investment managers 20, investment bankers 4, exchanges and/or trading networks for securities 6, reporting companies 10, brokers 12, rating companies 24, regulators 22, administrators 18, and/or third party providers of computer services 16.

Each insurance company 8 is digitally configured to directly and/or indirectly communicate with one or more providers of the desired accounting treatment, etc. 2, purchasers of the desired accounting treatment, etc. 14, investment managers 20, investment bankers 4, exchanges and/or trading networks for securities 6, reporting companies 10, brokers 12, rating companies 24, regulators 22, administrators 18, and/or third party providers of computer services 16.

Each investment manager 20 is digitally configured to directly and/or indirectly communicate with one or more providers of the desired accounting treatment, etc. 2, purchasers of the desired accounting treatment, etc. 14, insurance companies 8, investment bankers 4, exchanges and/or trading networks for securities 6, reporting companies 10, brokers 12, rating companies 24, regulators 22, administrators 18, and/or third party providers of computer services 16.

Each investment banker 4 is digitally configured to directly and/or indirectly communicate with one or more providers of the desired accounting treatment, etc. 2, purchasers of the desired accounting treatment, etc. 14, investment managers 20, insurance companies 8, exchanges and/or trading networks for securities 6, reporting companies 10, brokers 12, rating companies 24, regulators 22, administrators 18, and/or third party providers of computer services 16.

Each exchange and/or trading network 6 is digitally configured to directly and/or indirectly communicate with one or more providers of the desired accounting treatment, etc. 2, purchasers of the desired accounting treatment, etc. 14, investment managers 20, investment bankers 4, insurance companies 8, reporting companies 10, brokers 12, rating companies 24, regulators 22, administrators 18, and/or third party providers of computer services 16.

Each reporting company 10 is digitally configured to directly and/or indirectly communicate with one or more providers of the desired accounting treatment, etc. 2, purchasers of the desired accounting treatment, etc. 14, investment managers 20, investment bankers 4, exchanges and/or trading networks for securities 6, insurance companies 8, brokers 12, rating companies 24, regulators 22, administrators 18, and/or third party providers of computer services 16.

Each broker 12 is digitally configured to directly and/or indirectly communicate with one or more providers of the desired accounting treatment, etc. 2, purchasers of the desired accounting treatment, etc. 14, investment managers 20, investment bankers 4, exchanges and/or trading networks for securities 6, reporting companies 10, insurance companies 8, rating companies 24, regulators 22, administrators 18, and/or third party providers of computer services 16.

Each rating company 24 is digitally configured to directly and/or indirectly communicate with one or more providers of the desired accounting treatment, etc. 2, purchasers of the desired accounting treatment, etc. 14, investment managers 20, investment bankers 4, exchanges and/or trading networks for securities 6, reporting companies 10, brokers 12, insurance companies 8, regulators 22, administrators 18, and/or third party providers of computer services 16.

Each regulator is digitally configured to directly and/or indirectly communicate with one or more providers of the desired accounting treatment, etc. 2, purchasers of the desired accounting treatment, etc. 14, investment managers 20, investment bankers 4, exchanges and/or trading networks for securities 6, reporting companies 10, brokers 12, rating companies 24, insurance companies 8, administrators 18, and/or third party providers of computer services 16.

Each administrator 18 is digitally configured to directly and/or indirectly communicate with one or more providers of the desired accounting treatment, etc. 2, purchasers of the desired accounting treatment, etc. 14, investment managers 20, investment bankers 4, exchanges and/or trading networks for securities 6, reporting companies 10, brokers 12, rating companies 24, regulators 22, insurance companies 8, and/or third party providers of computer services 16.

Each third party provider of computer services 16 is digitally configured to directly and/or indirectly communicate with one or more providers of the desired accounting treatment, etc. 2, purchasers of the desired accounting treatment, etc. 14, investment managers 20, investment bankers 4, exchanges and/or trading networks for securities 6, reporting companies 10, brokers 12, rating companies 24, regulators 22, administrators 18, and/or insurance companies 8. The providers of the desired accounting treatment, etc. 2, purchasers of the desired accounting treatment, etc. 14, insurance companies 8, investment managers 20, investment bankers 4, exchanges and/or trading networks for securities 6, reporting companies 10, brokers 12, rating companies 24, regulators 22, administrators 18, and third party providers of computer services 16 can be configured to directly and/or indirectly communicate with one another across one or more networks 30. The network(s) can comprise any of a number of different combinations of one or more different types of networks, including data and/or voice networks. For example, the network(s) can include one or more data networks, such as a local area network (LAN), a metropolitan area network (MAN), and/or a wide area network (WAN) (e.g., the Internet), and include one or more voice networks, such as a public-switched telephone network (PSTN). Although not shown, the network(s) may include one or more switches, routers and/or other components for relaying data, information or the like between the providers of the desired accounting treatment, etc. 2, purchasers of the desired accounting treatment, etc. 14, insurance companies 8, investment managers 20, investment bankers 4, exchanges and/or trading networks for securities 6, reporting companies 10, brokers 12, rating companies 24, regulators 22, administrators 18, and/or third party providers of computer services 16.

The providers of the desired accounting treatment, etc. 2, purchasers of the desired accounting treatment, etc. 14, insurance companies 8, investment managers 20, investment bankers 4, exchanges and/or trading networks for securities 6, reporting companies 10, brokers 12, rating companies 24, regulators 22, administrators 18, and third party providers of computer services 16 can comprise any one or more of a number of different apparatuses, devices or the like configured to operate in accordance with embodiments herein. In this regard, one or more of the providers of the desired accounting treatment, etc. 2, purchasers of the desired accounting treatment, etc. 14, insurance companies 8, investment managers 20, investment bankers 4, exchanges and/or trading networks for securities 6, reporting companies 10, brokers 12, rating companies 24, regulators 22, administrators 18, and third party providers of computer services 16 can comprise, include or be embodied in one or more processing apparatuses, such as one or more of a laptop computer, desktop computer, server computer or the like.

Additionally or alternatively, one or more of the providers of the desired accounting treatment, etc. 2, purchasers of the desired accounting treatment, etc. 14, insurance companies 8, investment managers 20, investment bankers 4, exchanges and/or trading networks for securities 6, reporting companies 10, brokers 12, rating companies 24, regulators 22, administrators 18, and third party providers of computer services 16 can comprise, include or be embodied in one or more portable electronic devices, such as one or more of a mobile telephone, portable digital assistant (PDA), pager or the like. For example, the providers of the desired accounting treatment, etc. 2, purchasers of the desired accounting treatment, etc. 14, insurance companies 8, investment managers 20, investment bankers 4, exchanges and/or trading networks for securities 6, reporting companies 10, brokers 12, rating companies 24, regulators 22, administrators 18, and/or third party providers of computer services 16 can each comprise a processing apparatus (e.g., a computer) configured to communicate with one another across the Internet (e.g., network 30).

It should be understood, however, that one or more of the providers of the desired accounting treatment, etc. 2, purchasers of the desired accounting treatment, etc. (policyholders and/or protection buyers) 14, insurance companies 8, investment managers 20, investment bankers 4, exchanges and/or trading networks for securities 6, reporting companies 10, brokers 12, rating companies 24, regulators 22, administrators 18, and third party providers of computer services 16 can comprise or otherwise be associated with a user carrying out the functions of the respective apparatus. For example, the provider of the desired accounting treatment, etc. 2 can comprise a provider of the desired accounting treatment, etc. user (provider of the desired accounting treatment, etc. or another operator under direction of the provider of the desired accounting treatment, etc.) communicating across a PSTN (e.g., network 30) or in person with a purchaser of the desired accounting treatment, etc. 14 user (purchaser of the desired accounting treatment, etc. or another operator under direction of the purchaser of the desired accounting treatment, etc.) operating one or more purchaser of the desired accounting treatment, etc. processing apparatuses, where the purchaser of the desired accounting treatment, etc. user and processing apparatus(es) collectively comprise the purchaser of the desired accounting treatment, etc. Similarly, for example, the provider of the desired accounting treatment, etc. can comprise a provider of the desired accounting treatment, etc. user communicating across a PSTN or in person with an insurance company user (insurance company or another operator under direction of the insurance company operating one or more insurance company processing apparatuses, where the insurance company user and processing apparatus(es) collectively comprise the insurance company. Similarly for each entity depicted in FIG. 1 with respect to each other entity depicted in FIG. 1.

As explained below, then, the term "provider of the desired accounting treatment, etc." can refer to a provider of the desired accounting treatment, etc. including a provider of the desired accounting treatment, etc. user and/or one or more provider of the desired accounting treatment, etc. processing apparatuses. Similarly, a "purchaser of the desired accounting treatment, etc." can refer to a purchaser of the desired accounting treatment, etc. including a purchaser of the desired accounting treatment, etc. user and/or one or more purchaser of the desired accounting treatment, etc. processing apparatuses. And an "insurance company" can refer to an insurance company user and/or one or more insurance company processing apparatuses. Similarly for each entity depicted in FIG. 1.

Referring now to FIG. 2, a block diagram of a processing apparatus (e.g., computer in a system) that may be configured to operate as is shown in accordance with exemplary embodiments herein. Although shown as separate entities, in some embodiments, one or more processing apparatuses may support one or more of a providers of the desired accounting treatment, etc. 2, purchasers of the desired accounting treatment, etc. 14, insurance companies 8, investment managers 20, investment bankers 4, exchanges and/or trading networks for securities 6, reporting companies 10, brokers 12, rating companies 24, regulators 22, administrators 18, or third party providers of computer services 16, logically separated but co-located within the entit(ies). For example, a single processing apparatus may support a logically separate, but co-located life insurance company and investment manager processing apparatus.

The processing apparatus that may be configured to operate for each entity depicted in FIG. 1 includes various means for performing one or more functions in accordance with exemplary embodiments herein, including those more particularly shown and described herein. It should be understood, however, that one or more of the apparatuses may include alternative means for performing one or more like functions, without departing from the spirit and scope of that which is overall presented herein. More particularly, for example, as shown in FIG. 2, the apparatus can include a processor 50 connected to a memory 52. The memory 52 can comprise volatile and/or non-volatile memory, and typically stores content, data or the like. In this regard, the memory 52 may store software applications 54, instructions or the like for the processor to perform steps associated with operation of the apparatus in accordance with embodiments herein. The memory 52 may also store content transmitted from, and/or received by, the apparatus, such as in one or more databases 56. As described herein, the software application(s) may each comprise software operated by the respective entities. It should be understood, however, that any one or more of the software applications described herein can alternatively be implemented in firmware and/or hardware, without departing from the spirit and scope of that which is presented herein.

In addition to the memory 52, the processor 50 can also be connected to at least one interface, e.g., including an output device, or other means for displaying, printing, transmitting and/or receiving data, content or the like. In this regard, the interface(s) can include at least one communication interface 58 or other means for transmitting and/or receiving data, content or the like. In addition to the communication interface(s), the interface(s) can also include at least one user interface that can include one or more earphones and/or speakers, a display 60, and/or a user input interface 62. The user input interface, in turn, can comprise any of a number of devices allowing the apparatus to receive data from a user, such as a microphone, a keypad, a touch display, a joystick, or other input device.

According to one aspect, all or a portion of the system, including association with one or more entities depicted in FIG. 1, generally operates under control of a computer program product. The computer program product for performing the methods of embodiments includes a computer-readable storage medium, such as the non-volatile storage medium, and computer-readable program code portions, such as a series of computer instructions, embodied in the computer-readable storage medium.

FIG. 3 is a flow chart of a method using an apparatus for implementing a multiple NAV in accordance with an exemplary embodiment. The exemplary embodiment presented in FIG. 3 may be implemented on at least one processing apparatus. The processing apparatus(es) may be associated with one or more of the entities depicted in FIG. 1. If more than one processing apparatus is implementing the embodiment, the processing apparatuses may work interdependently, independently, or some combination of both.

Possible agreements for providing the desired accounting treatment whose terms may be entered 100 into the processing apparatus(es) memory include, but are not limited to: 1) a traditional SVP agreement; 2) a traditional SVP agreement enhanced by one or more exemplary embodiments herein; 3) an agreement with a class of ownership interest; 4) a specified event swap; 5) a specified event bond; 6) a specified event put option; and/or 7) any combination of the preceding. In this or other embodiments herein, transforming or creating data occurs by processing, with the processing apparatus(es), according to the terms, and output is produced so as to correspond with the terms.

If multiple agreements are utilized in the embodiment and the embodiment is implemented on one processing apparatus, the terms of all of the agreements may be entered 100 into the processing apparatus.

If multiple agreements are utilized in the embodiment and the embodiment is implemented on multiple processing apparatuses, the terms of each of the agreements may be entered 100 into at least one of the processing apparatuses.

The initial data for each agreement may be entered 102 into the processing apparatus(es) that received the terms of the agreement.

Given the terms of the agreement(s) 100 and the initial data for the agreement(s) 102, the processing apparatus(es) may then determine an initial stable surrender NAV (possible alternative designations include initial contract NAV and initial book NAV), an initial market NAV, and/or an initial NAV that applies if funds are reallocated from a stable fund to a non-stable fund 104 and then output the initial NAVs 106. If multiple agreements and processing apparatuses are utilized in the embodiment and if the computers are working at least in part interdependently, the initial NAVs determined 104 by one or more processing apparatuses may be output 106 to, entered into 102, and utilized by at least one processing apparatus in the process of determining the initial NAVs 104.

Updated data may be input 108 on an ongoing basis (e.g., as it becomes available), on a periodic basis (e.g., quarterly, monthly, weekly, daily, etc.), and/or on a real time basis.

Given the terms of the agreement(s) and the updated data for the agreement(s), the processing apparatus(es) may then determine an updated stable surrender NAV, an updated market NAV, and an updated NAV that applies if funds are reallocated from a stable fund to a non-stable fund 110 and then output the updated NAVs on an ongoing basis, a periodic basis and/or a real time basis 112. If multiple agreements and processing apparatuses are utilized in the embodiment and if the computers are working at least in part interdependently, the updated NAVs determined 110 by one or more processing apparatuses may be output 112, entered into 108, and utilized by at least one processing apparatus in the process determining the updated NAVs 110.

Stable value contracts provide the purchaser of the desired accounting treatment with the ability to value investments on their books (book value) at a contract value rather than at market value. Because the contract value is, for the purposes of the purchaser of the desired accounting treatment, the book value of the investment, it is common practice to refer to the contract value as the book value and the following exposition frequently employs this convention (note that the contract value may also be referred to as the stable value in some expositions).

The terms of a stable value contract can include a crediting rate adjustment process where the crediting rate is the stable value rate of return that is used to determine the contract (book) value.

FIG. 4 is a flow chart of an illustrative embodiment that can offer the policyholder and/or protection buyer one or more of the following features: 1) choices regarding the stable value contract with differing features, including differing processes to adjust the crediting rate; 2) the choice of lower fees for choosing stable value contract with features that reduce the risk to the provider of the desired accounting treatment—the provider of stable value protection (SVP); 3) the choice of different combinations of minimum (before a forced write down of asset value and/or a forced 100% reallocation to money market) market value to book value ratios (MV/BV) and the fee for providing the desired accounting treatment (with higher minimum ratios having lower fees due to the lower risk to the SVP provider); 4) the choice of illustrative embodiments of stable value contract terms that can reduce the probability of "falling off the cliff" (e.g., being forced to reallocate to a money market fund and/or book a loss that reduces accounting income in the event that the MV/BV ratio falls below the minimum MV/BV) and reduce the risk for the SVP provider.

The embodiment presented in FIG. 4 may be implemented on at least one essentially digital processing apparatus. The processing apparatus(es) may be associated with one or more of the entities depicted in FIG. 1. If more than one processing apparatus is implementing the embodiment, the processing apparatuses may work interdependently, independently, or some combination of both.

FIG. 4 is a flow chart of an illustrative embodiment that provides the policyholder with a menu of risk/return/cost choices 200 that include all of the above mentioned features. The menu of choices 200 may include choices regarding the stable value contract terms 202 and the minimum allowable (before being forced into money market fund and/or book a large loss) MV/BV 204.

The choices regarding minimum MV/BV 204 may be expressed as a range of ratios 206.

The stable value contract terms choices 202 and the minimum MV/BV choices 206 jointly determine 224 the risk of "falling off the cliff," fees and the set of allowable and/or feasible investments—which may in turn define a set of investment risk/return options.

Stable value contract terms choices 202 can include the traditional stable value contract terms 208 and one or more of the illustrative embodiments of stable value contract terms 210.

The illustrative embodiments of stable value contract terms include: determining the stable value return using a built-up moving average of the yield-to-worst of the investment portfolio 212; a variable adjustment speed factor 214; an adjustment factor EF that fully amortizes an enhancement amount EA and an amortization of EA relative to the market value of the portfolio 216; and a required partial allocation to money market in response to a specified event 218.

The illustrative embodiments (FIGS. 4A, 4B, 4C and 4D) of stable value contract terms can all be utilized together in a stable value contract, or they can be used individually or in any combination.

The built-up moving average embodiment is an illustrative example of a broader embodiment. In the broader embodiment the stable value return is determined using a measure of the expected long-run return on the investment portfolio. The built-up moving average embodiment employs a built-up moving average of the yield-to-worst of the investment portfolio as a measure of the expected long-run return on the investment portfolio. Other illustrative embodiments may employ different measures of the expected long-run average return on the investment portfolio.

Possible other measures of the expected long-run average return on the investment portfolio include, but are not limited to: 1) econometric estimates of future returns; 2) fundamental analysis based on historical average returns (possibly broken up into components such as the real return and the inflation rate); and, 3) a combination of econometric and fundamental analysis.

A built-up moving average (where the length of the moving average is approximately equal to the duration of the investment portfolio) provides a robust estimate of the long-term expected return that can be easily and quickly implemented within the context of a stable value contract. For example, a the terms of a traditional stable value contract will typically include an equation similar to the following that is used to calculate the stable value return—which is commonly referred to in the contract as the crediting rate (CR).

$$CR=[(1+Y)*((MV+EA)/BV)^{1/D}]-EF-1 \text{ or } 0; \text{ whichever is greater, where:}$$

MV is the covered portfolio market value on the reference date;
EA is an amount equal to the product of (I) the Enhancement Adjustment Amount on the reset date and (II) a fraction, the numerator of which is the covered portfolio book value on the reference date and the denominator of which is the contract book value on the reference date;
BV is an amount equal to the covered portfolio book value on the reference date;
D is the duration (expressed in years or a fraction thereof) of the Reference Securities on the reference date (or a number, such as 3.5, fixed in the contract terms);
Y is the annual effective yield to worst of the Reference Securities on the reference date;
EF is an amount equal to the Enhancement Factor on the reset date; and,
CR is reset quarterly.

The terms of the traditional stable value contract can by modified to use the built-up moving average of the yield-to-worst (Y) simply by replacing Y with EY in the formula for determining the stable value return (the crediting rate, or CR) as follows:

$$CR=[(1+EY)*((MV+EA)/BV)^{1/D}]-EF-1 \text{ or } 0, \text{ whichever is greater where:}$$

EY is a built-up moving average of Y.

EY can be calculated a number of ways.

In one variation, given a moving average of 60 months, and assuming that the investment portfolio covered by the stable value contract was purchased in month 0: EY for month 1 will equal the Y for month 0 multiplied by 60 with the result divided by 60; EY for month 2 will equal the Y for month 1 plus the Y for month 0 multiplied by 59 with the result divided by 60; EY for month 3 equals the Y for month 2 plus the Y for month 1 plus the Y for month 0 multiplied by 58, etc. until month 60 at which point EY becomes a simple 60 month moving average of Y for the previous 60 months.

In another variation, again given a moving average of 60 months, and again assuming that the investment portfolio covered by the stable value contract was purchased in month 0: EY for month 1 equals the Y for month 0; EY for month 2 equals the Y for month 0 plus the Y for month 1 with the result divided by 2; EY for month 3 equals the Y for month 0 plus the Y for month 1 plus the Y for month 2 with the result divided by 3, etc. until month 60 at which point EY becomes a simple 60 month moving average of Y for the previous 60 months.

Results obtained from simulation models demonstrate that replacing Y with a built-up moving average of Y in the terms of a stable value contract can result in: 1) a reduced risk of "falling off the cliff" (a forced write down of book value and/or a forced 100% reallocation to money market) for the purchaser of the stable value protection (SVP); 2) a more stable (less variable) stable value return for the purchasers of the SVP; and, 3) reduced risk for the provider of the SVP.

Another illustrative embodiment of stable value contract terms is a variable adjustment speed factor. Incorporating a variable adjustment speed factor into the terms of a stable value contract can: 1) significantly reduce the risk (and expected cost) of "falling off the cliff" for the purchaser of the SVP; and; 2) significantly reduce risk for the provider of the SVP.

Traditional stable value contract terms specify an adjustment speed factor, 1/D that is either constant (if the contract specifies a fixed number for D) or effectively constant (if D equals the actual duration of the investment portfolio)

because the actual duration of the investment portfolio typically varies very little. Because the fixed (or effectively fixed) adjustment speed is very slow, the result is a significant risk for purchasers of SVP of "falling off the cliff" and, for providers of SVP, an increased risk exposure.

The consequences for the policyholder and/or protection buyer of "falling off the cliff" can be significant. Given the consequences of "falling off the cliff," policyholders and/or protection buyers may prefer a process that reduces this probability—even if a more rapid adjustment of the crediting rate (stable value return) increases the short-term volatility of the accounting earnings on the invested funds.

If the consequence of a breach is a forced shift to a money market fund, the policyholder's and/or protection buyer's return on investment may fall significantly. The lower yield can make it difficult to "make back" the shortfall of MV to BV, thus forcing the policyholder and/or protection buyer to remain in a lower yielding money market fund for a significant period of time. And the forced shift into a money market fund may occur just as interest rates are peaking, thus preventing the policyholder and/or protection buyer from reaping the gains that will accrue for a longer-duration portfolio as interest rates fall.

If the consequence is booking a loss (from BV to MV), the accounting profits of the policyholder and/or protection buyer can be significantly reduced. The result can be a fall in the policyholder's and/or protection buyer's stock price.

The illustrative embodiment of the terms of a stable value contract including a variable adjustment speed factor is an illustrative embodiment of an exemplary embodiment in which the terms of the stable value contract make the process of adjusting the stable value return (e.g., the crediting rate, CR) a function of risk.

Factors that can affect risk include, but are not limited to:
The current level of MV/BV (as MV/BV falls below 1 and approaches breach, risk increases);
The risk of surrender by the policy owner, which in turn may be a function of the financial health of the policy owner and the taxable gain that will result from surrender;
The asset class;
The surrender options available to the provider of the desired accounting treatment (e.g., standard process, modified standard process, enhanced crawl out options, etc.); and/or,
Systemic risk.

An example of a stable value contract terms including a variable adjustment speed factor is the use a formula for determining the stable value return (the crediting rate or CR) in which the speed of adjustment for CR increases as the MV/BV ratio approaches breach (the point at which the SVP purchaser will "fall off the cliff"). In the following example A is the acceleration (variable adjustment speed) factor that determines the speed with which the crediting rate responds to divergences of (MV+EA)/BV from a value of one. The acceleration factor A increases as the MV/BV ratio approaches breach and, as A increases the CR adjusts faster.

$$CR = ((MV+EA)/BV)^{A} * (1+EY) * (1-EF) - 1 \text{ and}$$

$$A = 1/(a+b*((MV+EA)/BV-BR)/(1-BR)) \text{ for } (MV+EA)/BV > BR \text{ but equal to or less than 1;}$$

$$A = 1/a \text{ for } (MV+EA)/BV \text{ equal to or less than BR}$$

$$A = 1/(a+b) \text{ for } (MV+EA)/BV > 1$$

Where:
CR is the crediting rate.
MV is the market value.
EA is the Enhancement Amount.
BV is the book value.
A is the Acceleration factor.
EY is a built-up moving average of Y, the Yield to Worst of the investment portfolio.
EF is the amortization factor for fully amortizing EA and wherein EA is amortized relative to MV.
1/a is the maximum value for the Acceleration factor, A (may be increased as risk increases).
1/(a+b) is the minimum value for the Acceleration factor, A.
BR is the Breach Ratio.

The variable adjustment speed factor addresses only one aspect of risk—changes in the MV/BV. Exemplary examples of the present invention can include risk-adjusted adjustment processes that incorporate the ability to respond to changes in risk factors other than changes in the MV/BV.

Exemplary embodiments of the present invention can include risk-adjusted processes for setting the crediting rate in which the response of A to changes in the MV/BV and/or the (MV+EA)/BV ratio can change in response to changes in other risk factors, including, but not limited to: 1) changes in the risk of surrender; 2) changes in the asset class/classes; 3) changes in the portfolio manager/managers; 4) changes in investment management policies and/or guidelines; 5) changes in the credit risk of the underlying investments; 6) changes in the surrender process; and/or 7) changes in systemic risk.

In the case of systemic risk, the risk-adjusted process for setting the crediting rate can be further modified to reduce the risk of asset bubbles (e.g., market prices in excess of true economic values) that can be associated with times of significant systemic risk.

Exemplary embodiments of the present invention can include computerized configurations for detecting the presence of systemic risk and estimating its magnitude. A principle that can be employed by these exemplary embodiments is that systemic risk increases as key economic factors diverge from the mean in directions that can be expected to negatively impact future changes in asset values. The larger and longer lasting the deviation from the mean, the greater the systemic risk may be. Examples of possible key economic variable include: 1) the real rate of interest (prolonged periods of real rates below long-term averages may be a component of both asset bubbles and prolonged periods of inflation); 2) P/E ratios (in real estate as well as stocks) in excess of their long-term averages; 3) credit risk spreads that have significantly diverged from their long-term averages; 4) relative levels of financial leverage
especially the use of short-term debt to finance long-term assets—that exceed the long-term average; 5) other measures of speculative activity (e.g., number of IPO's and short-term rates of return on IPO's relative to long-term averages); and/or 6) periods of unusually low volatility (relative to long-term averages) in financial markets—standard risk models that project future volatility to equal current volatility may produce the perverse result of lower risk estimates in times when systemic risk is building up to high levels.

Exemplary embodiments of the present invention can include risk-adjusted processes for setting the crediting rate that respond to any identified risk factor, including systemic risk. The role of A in the sample risk-adjusted crediting rate setting process presented below is to accelerate the adjustment of the crediting rate as risk increases.

The greater A is, the greater the speed of the adjustment of the crediting rate. The smaller A is, the slower the speed of the adjustment of the crediting rate. As a result, in order to reduce risk, A can be varied to increase the speed of adjustment (higher A) as MV/BV falls and to decrease the speed of adjustment (down to some lower limit) as MV/BV increases. The amount of the adjustment of A in response to changes in MV/BV can also be adjusted for risk so as to increase the protection for the SVP provider as risk increases by increasing the rate at which A increases as MV/BV decreases. Further, a systemic risk amount, SA, and/or a systemic risk adjustment factor, SR, may be included in certain exemplary examples.

One possible form of this risk-adjusted crediting process is presented below:

$$CR = \text{the greater of } ((MV+EA-SA)/BV)^{A}*(1+EY)*(1-EF)*(1-SR)-1 \text{ or some specified minimum,}$$
which may vary with risk, and $$A = 1/(a+b*(((MV+EA-SA)/BV-BR)/(1-BR))) \text{ for } (MV+EA-SA)/BV > BR \text{ but equal to or less than } 1;$$

$$A = 1/a \text{ for } (MV+EA-SA)/BV \text{ equal to or less than BR}$$

$$A = 1/(a+b) \text{ for } (MV+EA-SA)/BV > 1$$

Where:
CR is the crediting rate.
MV is the market value.
EA is the Enhancement Amount.
SA is the Systemic Risk amount.
BV is the book value.
A is the Acceleration factor.
EY is a built-up moving average of Y, the Yield to Worst of the investment portfolio.
EF is the amortization factor for fully amortizing EA and wherein EA is amortized relative to MV.
SR is the systemic risk adjustment factor for building up a Systemic Risk amount equal to SA.
1/a is the maximum value for the Acceleration factor, A (may increase as risk increases).
1/(a+b) is the minimum value for the Acceleration factor, A.
BR is the Breach Ratio.
r is the Risk factor, which increases as risk increases.

If r<1, the acceleration factor A will initially rise slowly as MV+EA−SA falls below BV, thus maintaining much of the dampening of the fluctuations in the crediting rate. However, as (MV+EA−SA)/BV approaches BR (the breach ratio), A will increase rapidly, thus quickly pushing the crediting rate to its lower limit and working to prevent breach.

As r is increased to a sufficiently large number, the crediting rate will fall almost immediately to its lower limit (e.g., zero) whenever (MV+EA−SA)/BV becomes less than one.

In this risk-adjusted process, r can be increased (and 1/a may be increased) in response to an increase in any of the risk factors (including systemic risk). If a condition of systemic risk is detected, SA and SR can become positive and increase over time, provided that systemic risk continues exist and increase. In some exemplary embodiments, SA may be estimated to equal the difference between the present value of the expected cash flows of the assets discounted at the long-term average real rate of interest and the current market value of the assets.

A feature of a stable value contract can be the ability to include an Enhancement Amount that is added to the starting market value in order to increase the starting book value so as to avoid a decrease in earnings as a result of certain initial costs (e.g., premium taxes). Another illustrative embodiment is a computerized configuration to implement terms of a stable value contract that determine an adjustment factor EF that fully amortizes an enhancement amount EA and wherein the EA is amortized relative to the market value of the investment portfolio.

Full amortization of EA by EF can be accomplished by a combination of a new form for the stable value return equation, a new process for calculating EF, and a new process for calculating the amortization of EA relative to the market value of the investment portfolio—rather than relative to the book value of the portfolio.

In the new form of the crediting rate equation (see below), the EF factor enters the equation multiplicatively rather than as a subtraction as in the traditional terms of a stable value contract.

$$CR = ((MV+EAt)/BV)^{1/D}*(1+Y)*(1-EF)-1$$

CR is the Crediting Rate.
MV is the market value of the portfolio.
EA is the Enhancement Amount
BV is the book value of the portfolio.
D is the duration (actual or assigned) of the portfolio.
Y is the yield to worst of the portfolio.
EF is the Enhancement Factor (the reduction in the crediting rate so as to fully amortize the original Enhancement Amount ($EA_0$) over the amortization period).

This new form of the crediting rate adjustment process makes it possible to define an EF (and associated full amortization of $EA_0$) that is independent of Y. In the crediting rate adjustment process that is used today, the EF that will fully amortize $EA_0$ over the stated amortization period is a positive function of Y—the higher that Y turns out to be, the larger EF must be in order to fully amortize EA over the amortization period. Therefore, given the form of the credit adjustment process that is presently used, it is necessary to know what level of Y will prevail over the amortization period in order to calculate the EF that will fully amortize $EA_0$ over the amortization period—which requires predicting the future.

In contrast, this new form of the crediting rate adjustment process allows the calculation of an EF that fully amortizes $EA_0$ over the amortization period and is independent of Y. Specifically:

$$EF = 1 - 1/(1+EA_0/MV_0)^{1/N}$$

EF is the Enhancement Factor that fully amortizes $EA_0$ over the amortization period
$EA_0$ is the original Enhancement Amount at t=0
$MV_0$ is the starting market value at t=0
N is the amortization of EA in years
Given the EF as defined above, $EA_0$ is amortized according to the following formula:

$$EA_t/MV_t = ((MV_0+EA_0)/MV)*(1-EF)^t - 1$$

$EA_t$ is the Enhancement Amount at time t
$MV_t$ is the market value at time t
t is the time in years, and t varies continuously between 0 and N Given the above defined amortization schedule, for any constant Y, $MV_t + EA_t$ will always equal $BV_t$ and, at t=N, $EA_t$ will equal 0 (at which point EF becomes 0).

The crediting rate adjustment process that is presently used makes the EF that will fully amortize $EA_0$ over the amortization period a function of Y. In this equation, $$CR = ((MV+EA)/BV)^{1/D}*(1+Y)-EF-1$$

Although this current state of the art crediting rate adjustment formula makes the EF that will fully amortize EA0 a function of Y, the current state of the art does not consider this, but rather calculates an EF that is too small to fully amortize $EA_0$ over the stated amortization period (given a return on investment that is equal to or greater than zero over the amortization period). The result of the too small EF is an increase in the loss exposure of SVP providers as compared to the use of an EF that will fully amortize $EA_0$ over the amortization period.

The current state of the art is to define EF as follows:

$$EF=(EA_0/BV_0)/N$$

$BV_0$ is the book value at t=0 and $BV_0=MV_0+EA_0$
EA is then amortized using the following formula:

$$EA_t/BV_t=(EA_0/BV_0)/N-t/N*(EA_0/BV_0)/N$$

In addition to an EF that is less than the EF that will fully amortize $EA_0$ over the amortization period, the result is an amortization of EA in which for t>0 and t<N and any constant Y, $MV_t+EA_t<BV_t$.

Because EF is defined to be insufficient to fully amortize $EA_0$ over the amortization period, the current state of the art produces an increased exposure to loss by SVP providers as compared to what they may experience by utilizing the illustrative embodiment presented above. Use of this exemplary embodiment can reduce the loss exposure of SVP providers by an amount equal to $20 to $40 million per $100 billion of market value. The potential of the illustrative embodiment to reduce the loss exposure of SVP providers can be even greater in turbulent market conditions because EA is amortized relative to MV, rather than relative to BV as in the current state of the art. Because the state of the art is to amortize EA relative to BV, EA will be overstated in situations in which BV exceeds MV, which in turn slows the adjustment of the crediting rate due to an overstated EA, which can further increase the loss exposure of the SVP provider.

In yet another illustrative embodiment is a computerized configuration to implement the terms of the stable value contract wherein the terms require a partial allocation to money market in response to a specified event.

In one variation of such terms, an amount of partial allocation to money market is required when the MV/BV ratio falls below a specified amount. There may be a series of specified MV/BV ratio amounts, with the required amount of partial allocation to money market increasing as the MV/BV ratio falls below lower specified MV/BV ratio amounts.

In another variation of such terms, a ratio of the current net asset value (NAV) relative to the maximum-to-date NAV and if the calculated ratio falls below a specified amount, an amount of a partial allocation to money market is required. Again there may be a series of specified ratio amounts, with the required amount of partial allocation to money market increasing as the calculated ratio falls below lower specified ratio amounts.

In still another variation of such terms, the amount(s) of the required partial allocation to money market is adjusted for the shape of the yield curve (e.g., the ratio of the current yield-to-worst of the investment portfolio to the current return on a money market fund).

Each of the illustrative embodiments for computerized configurations to implement the terms of a stable value contract at the beginning of a stated period of time period (e.g., the adjustment period) or at the end of the time period. An adjustment period can be any desired period of time—e.g., quarterly, monthly, weekly, etc.

FIG. 4A is a flow chart of an illustrative embodiment. In FIG. 4A, there is a storing in memory terms of an agreement governing a stable value contract whereby a stable value return is to be determined by using a built-up moving average of the yield-to-worst outcome of an investment portfolio 220. Calculating, by a digital computer accessing the memory and receiving market data, an amount of the built-up moving average 222. Determining, by the computer using the amount, at least one of a stable value return on the investment portfolio and a contract value for the investment portfolio 224. Outputting, by the computer, at least one of the determined stable value return and the determined contract value 226.

FIG. 4B is a flow chart of an illustrative embodiment. In FIG. 4B, there is a storing in memory terms of an agreement governing a stable value contract, the terms including a variable adjustment speed factor 240. Calculating, by a digital computer accessing the memory and receiving market data, an amount of the adjustment speed factor 242. Determining, by the computer using the calculated amount, at least one of a stable value return on the investment portfolio and a contract value for the investment portfolio 244. Outputting, by the computer, at least one of the determined stable value return and the contract value 246.

FIG. 4C is a flow chart of an illustrative embodiment. In FIG. 4C, there is a storing in memory terms of an agreement governing a stable value contract, the terms including an adjustment factor EF that fully amortizes an enhancement amount EA over a period of time specified in the terms and wherein the EA is amortized relative to a market value of an investment portfolio 260. Determining, by a digital computer accessing the memory, an amount of EF and an amortization of the EA relative to the market value 262. Determining, by the digital computer accessing the memory, receiving market data, and applying the determined amounts, at least one of a stable value return on the investment portfolio and a contract value for the investment portfolio 264. Outputting, by the computer, at least one of the determined stable value return and the contract value 266.

FIG. 4D is a flow chart of an illustrative embodiment. In FIG. 4D, there is a storing in memory terms of an agreement governing a stable value contract, the terms including a requirement for at least one partial allocation of an investment portfolio to at least one money market fund given an occurrence of at least one specified event 280. Determining, by a digital computer accessing the memory and receiving market data, whether the at least one specified event has occurred and, if the at least one specified event has occurred, outputting an amount for the at least one partial allocation 282. Determining, by the computer accessing the memory and receiving market data, at least one of a stable value return and the contract value of the investment portfolio 284. Outputting, by the computer, at least one of the determined stable value return and the contract value 286.

Exemplary embodiments herein may include computer-aided processes that offer one or more preferred groups access to the use and/or development of risk models. FIG. 5 is a flow chart of an example of such an embodiment. A group (or a set of groups) may be defined as the set of entities that are party to, and/or are potential (qualified) parties to, an agreement and/or a potential agreement (or agreements) regarding assumption of risk. Other groups may include (qualified) researchers seeking to test and/or develop risk models. The access of different groups to various databases and/or risk models (and/or specific variations of risk models) may be different.

Potential benefits of a risk model exemplary embodiment may, depending on the implementation, include, but are not limited to: 1) an increase in the number of providers of the desired accounting treatment and/or other assumption of risk; and/or 2) the facilitation of risk-based pricing—e.g., the dynamic pricing model exemplary embodiment exemplary.

The results may, depending on the implementation, include: 1) a better working market for the provision of the desired accounting treatment (and/or other assumption of risk); 2) increased investment choices, lower fees and improved investment performance for policyholders; and/or 3) reduced risk and more stable returns for the entities providing the desired accounting treatment (and/or other assumption of risk).

The embodiment may make possible a better understanding of risk by all of the parties to a transaction. This better understanding of risk by all of the parties to the transaction may result in the parties making decisions that reduce the total risk to all of the parties, thus allowing all of the parties to the transaction to reach an improved risk/return tradeoff (e.g., achieve higher returns with less risk).

The joint development, testing and refinement (on an ongoing basis) of risk models may result in significant improvements in our ability to measure and define risk as compared to present methodologies—which tend to equate risk with volatility and to predict future volatility (and therefore risk) based on recent historical volatility and may fail to factor in systemic risk, including the large-scale use of short-term debt to finance long-term assets and/or other factors.

These present backward-looking methods of assessing and quantifying risk have tended to fail periodically—sometimes, as in our current credit crisis, in spectacular fashion. One of the problems of these current methodologies may be that the very forces suppressing current volatility (and, therefore, apparent risk)—e.g., high liquidity, easy credit, low current defaults, etc.—may actually be creating an ever increasing (for as long as they continue) level of systemic risk that becomes larger and larger as credit availability and apparent liquidity continue to increase.

The joint development, testing and refinement process built into this exemplary embodiment may make it possible to go beyond present naïve, backward-looking risk assessments to sophisticated, continuously improving, forward-looking models of risk that incorporate systemic risk and are shared among all of the participants to a transaction. The widespread use of this exemplary embodiment may improve the stability of financial markets, thus reducing risk and improving the efficiency of financial decision making throughout the economy.

Consider the risk assumed by the providers of a desired accounting treatment. A risk faced by the provider of the desired accounting treatment is that market value may fall below book value and a specified event occurs (e.g., surrender of all policies), requiring the provider of the desired accounting treatment to pay out (to the policyholder and/or protection buyer) the difference between book value and market value. The risk faced by the provider of the desired accounting treatment is thus a function of the joint probability that market value will fall below book value (and by how much) and the probability of the specified event.

Present backward-looking methodologies for assessing the probability that market value will fall below book value (and by how much) may calculate the recent volatility of interest rates and apply this volatility number to the duration of a portfolio to estimate the probability of losses of any given magnitude.

Such an approach assumes that: 1) recent volatility is a good predictor of the future volatility of interest rates; and/or 2) the probability of an increase or a decrease in interest rates is equal.

As the current financial crisis has demonstrated, recent volatility may not be a good predictor of future volatility. Indeed, a long period of historically low volatility may be the result of increasing systemic risk that is laying the base for an explosion of volatility. Further, given the widespread observation of "reversion to the mean" in finance, interest rates may be more likely to rise than fall in some circumstances and more likely to fall than rise in others.

This exemplary embodiment provides a process for developing, testing, implementing and refining more sophisticated, forward-looking risk models that incorporate systemic risk.

Can variations in volatility be modeled? Can factors be identified (e.g., the large-scale financing of long-term securities with mostly short-term debt at a leverage of close to 30 to 1 by investment banks, off-balance-sheet entities of commercial banks, etc.) that create a growing risk of an explosion in volatility over time as they continue to grow? This exemplary embodiment provides a process for answering these questions and apply the results in a manner that may improve the decision making of all of the parties, reduce risk for everyone, and even (given widespread use) stabilize markets—thus making explosions of volatility and their associated financial crises, less likely.

The models developed using this process may incorporate the ideas and computer modeling technologies that have been developed by the new sciences that investigate the dynamic properties of systems, including: 1) non-linear dynamic systems (chaos theory); 2) emergence (complexity); and/or 3) the science of networks.

Can models be developed that determine whether interest rates are more likely to rise or fall? If so, risk may be more accurately priced (it is increases in interest rates, not decreases in interest rates that drive market value below book value) and investment decisions may be improved.

One approach may be to break down interest rates into components—e.g., the real rate of interest, the inflation premium, the default risk premium, the liquidity risk premium, and the maturity premium—and model the determination of each of the components. For example, in a series of articles several years ago, *The Economist* magazine examined the forces behind the below average long-term real interest rates that had prevailed world wide for a number of years. The articles concluded that the force behind the low real interest rates had been global investment demand below the long-term average relative to economic output. Given the massive amounts of infrastructure investments that are needed worldwide and the huge capital investments required for a shift to renewable energy sources, is this below average investment demand likely to shift to an above-average level of investment demand, thus driving real interest rates above their long-term average?

With regard to the inflation premium, a quarter-century of falling inflation has driven the inflation premium built into interest rates well below the long-term average inflation rate of 3.0% in the U.S. The long fall in inflation was assisted by a long fall in real energy prices (that only recently reversed, accompanied by an upsurge in inflation) and a massive shift of production to low wage economies (China in the case of goods and India in the case of services). Now that energy prices (and other commodity prices) are up dramatically as a result of rapidly rising demand from developing countries and production costs in China and India are rising due to rising wages and appreciating currencies, these two forces may be switching from inflation damping to inflation increasing.

Are the markets looking backward rather than forward and underestimating future inflation? At current (as of Sep. 12, 2008) weekly average interest rates, the market inflation premium as measured by the spread between the real interest rate on 10 year Treasury inflation-protected securities (TIPS) and the nominal interest rates on 10 year Treasury bonds was 1.95%. Given this spread, a long-term investor who chooses 10 year Treasury bonds over 10 year TIPS (both have essentially zero default risk) is betting that inflation will average less than 1.95% over the next 10 years—a bet that inflation will be more than one-third less than its long-term average rate over the next 10 years. Given the economic forces behind inflation and the low level of the current inflation premium relative to (long-term) average inflation, is the inflation premium built into current interest rates more likely to increase or decrease?

FIG. 5 is a flow chart of a possible implementation of an exemplary embodiment. The exemplary embodiment presented in FIG. 5 may be implemented on at least one processing apparatus. The processing apparatus(es) may be associated with one or more of the entities depicted in FIG. 1. If more than one processing apparatus is implementing the embodiment, the processing apparatuses may work interdependently, independently, or some combination of both.

A home page 300 offers visitors to the web site a number of choices, including a member log-in, an application for membership, and access to information open to the public. Member log-in may require the use of a password and/or other processes for maintaining security. There may be a number of classes of memberships and access to data and other information may be restricted by class of membership and/or the particulars of a member's activities.

Those seeking membership may be required to supply information 302 and submit it 304 for further action.

After logging in, members may choose from a number of options 306 including risk models and model testing and development. Members choosing the option of risk models may then be able to choose from a number of categories of risk models 308 including interest rate risk, credit risk, specified event risk, other risks, and joint risk (e.g., joint interest rate risk and specified event risk).

After specifying a category of risk models, members may select information on aspects of the models in the category 310, including, the theory or theories behind the model, the structure of the model, its goodness of fit, its prediction performance, and using the model. Member choosing to use a model will be guided to input the relevant data 312, be provided links to relevant databases, and output 316 the model's output.

Members selecting 306 model testing and development will be provided links to relevant databases 314, research results 318, statistical methodologies and tools 320, and discussion groups for past and ongoing research 322.

Further exemplary embodiments may include a computer-aided process for a dynamic pricing model or models (FIG. 6). A function of the dynamic pricing model (or models) is to introduce risk-based pricing into the process of delivering the desired accounting treatment or other assumption of risk.

Risk-based pricing may expand the investment options (investments and/or asset classes) available to policyholders and/or protection buyers, increase their ability to rebalance their investment portfolio as market conditions change, and make it possible for them to improve their risk/return tradeoff. It may align the interests of the purchasers and sellers of the desired accounting treatment, etc. and reduce system risk. It may lower costs for purchasers of the desired accounting treatment, etc. (policyholder and/or protection buyer) and stabilize profits for the sellers of the desired accounting treatment, etc.

In this exemplary embodiment, the model may be utilized to determine initial pricing for various investment options (investments and/or asset classes) that remains unchanged throughout the contract (for the desired accounting treatment, etc.). Or the model may contain agreed upon parameters and processes that determine new fee schedules on an ongoing and/or periodic basis as market conditions and/or policyholder and/or protection buyer factors change.

The model may apply to all of the (potential) investments and/or asset classes open to a policyholder and/or protection buyer or multiple policyholders and/or protection buyers. The model or modals may apply to all of the (potential) investments and/or asset classes open to some policyholders and/or protection buyers and only part of the investments and/or asset classes open to others. The model or models may apply only to a particular set of investments and/or asset classes, which may be held by one or more policyholders and/or protection buyers.

In the event of multiple models, the models may be independent, dependent, interdependent, or any combination of independent, dependent and interdependent. A model or models may be implemented by one processing apparatus or multiple processing apparatuses.

FIG. 6 illustrates how a pricing model functions according to one exemplary embodiment. And FIG. 6A illustrates how the model may be extended to encourage behavior that reduces risk (and, therefore, fees) and discourage behavior that increases risk, for individual policyholders and/or protection buyers and/or for groups of policyholders and/or protection buyers.

Groups of policyholders and/or protection buyers may arise for a number of reasons, including, but not limited to: 1) the policyholders and/or protection buyers are customers of the same provider of the desired accounting treatment, etc.; 2) the policyholders and/or protection buyers are all purchasers or potential purchasers of one or more methods of providing the desired accounting treatment, etc. (e.g., a SVP agreement, special classes of shares, specified event swaps, Specified Event Bonds, and/or specified event put options); 3) policyholders and/or protection buyers that have come together either formally or informally to bargain for lower costs and/or better terms for the desired accounting treatment, etc.; 4) policyholders and/or protection buyers and one or more providers of the desired accounting treatment, etc. that are bound together by a synthetic mutual structure with features that may include, for policyholders and/or protection buyers, rewards for reducing risk and punishments for increasing risk, and profit limitations for the provider(s) of the desired accounting treatment (or other risk assumption); and/or 5) partnerships of policyholders and/or protection buyers that may allow owners of lower-performing BOLI/COLI policies to exchange into higher performing policies and creating other benefits including lower fees and superior terms due to economies of scale and reduced risk for the provider(s) of the desired accounting treatment, etc.

The exemplary embodiment presented in FIG. 6 may be implemented on at least one processing apparatus. The processing apparatus(es) may be associated with one or more of the entities depicted in FIG. 1. If more than one processing apparatus is implementing the embodiment, the processing apparatuses may work interdependently, independently, or some combination of both.

In FIG. 6, the dynamic pricing model is implemented by entering data regarding the risk of at least one investment/asset class 400. The risk data regarding the investment/asset class may include the terms of an agreement or agreements regarding the provision of the desired accounting treatment, etc. (e.g., the specification of an adjustment process, minimum MV/BV, etc.). The risk data regarding the investment/asset class may pertain to stand-alone risk and/or portfolio risk. In the event that the data pertains to portfolio risk, it may include a specification of and/or limitations on the other potential investments in the portfolio and/or risk data (including possibly joint risk data) regarding the potential investments in the portfolio.

Data may also be entered regarding the risk of at least one specified event 402. Data entered may include data regarding the risk of one or more individual specified events and, if more than one, data regarding joint risks.

The system then determines the joint risk 404 of the investment/asset class and at least one specified event (e.g., determining the joint probability of market value less than book value, and by how much, with the probability of one or more specified events). Market pricing data 406 is entered into the system (market pricing data may be derived from primary and/or secondary market transactions) and the system then determines and outputs 408 a price (fee) schedule for providing the desired accounting treatment or other assumption of risk.

The dynamic pricing process illustrated in FIG. 6 may occur only once or it may occur on an ongoing and/or periodic basis (e.g., in response to changes in one or more factors impacting joint risk).

The exemplary embodiment presented in FIG. 6A may be implemented on at least one processing apparatus. The processing apparatus(es) may be associated with one or more of the entities depicted in FIG. 1. If more than one processing apparatus is implementing the embodiment, the processing apparatuses may work interdependently, independently, or some combination of both.

FIG. 6A is a flow chart of an exemplary embodiment that may encourage behavior that reduces risk (and, therefore, fees) and discourage behavior that increases risk, both for individual policyholders and/or protection buyers and for groups of policyholders and/or protection buyers.

The computer-aided process may begin with risk-based, as determined in FIG. 6, fees 420 for providing the desired accounting treatment, etc. Actions that increase risk 422 are specified and input into the system for individual policyholders and/or protection buyers and, if applicable, for joint actions. Actions that decrease risk 424 are specified and input into the system for individual policyholders and/or protection buyers and, if applicable, for joint actions. The system then determines and outputs a schedule of adjusted fees, potential refunds (for actions taken or not taken), and penalties (for actions taken or not taken) 426.

The process of the exemplary embodiment illustrated in FIG. 6A may include synthetic mutual structures or entities that may reduce the risks faced by providers of the desired accounting treatment, etc. in return for the acceptance of a cap on profitability. In return for accepting a cap on profitability, the providers of the desired accounting treatment, etc. may be allowed to increase fees in the event that losses incurred and/or exposure to losses are higher than originally anticipated.

Correspondingly, the purchasers of the desired accounting treatment, etc. may be assured of an opportunity to achieve lower net costs over time if losses and/or exposure to losses than originally anticipated while confining exposure to higher fees within defined limits. A formulaic cushion may be factored into early year fees along with a formulaic method for apportioning refunds, higher crediting rates and/or reducing future fees of members in good standing.

Surrendering policyholders and/or protection buyers may forfeit a portion of all future refunds, crediting rate enhancements and/or cost reductions. What is more, all or part of any excess early fees may effectively provide a back-stop for policyholders and/or protection buyers during periods when crediting rates might otherwise drop to undesirable levels. Thus, it may be possible to engineer significant economic incentives and/or disincentives into the synthetic mutual structure or entity that will reduce the probability that policyholders and/or protection buyers will take on ill advised levels of risk and/or surrender policies due to temporary market value declines. It may even be possible for purchasers of the desired protection to receive a capital stake in the mutual or synthetic mutual structure, thereby further reducing the probability of harmful behaviors and/or surrenders.

Still another exemplary embodiment (FIG. 7) is a computerized configuration to implement at least one agreement between a first class of ownership interest and at least one other class of ownership interest wherein the first class of ownership interest pays consideration to the at least one other class of ownership interest in return for the desired accounting treatment, risk mitigation, etc. In such an embodiment, an accounting treatment can include accounting for an investment at a contract value (also, depending on the context, can be referred to as a "stable value" or "book value") rather than at market value.

Such an exemplary embodiment processing can provide the desired accounting treatment, etc. by allowing an investor in an other class of ownership interest (meeting specified qualifying requirements) the ability to earn consideration from a first class of ownership interest in return for providing the desired accounting treatment, etc. As may be desired, such an embodiment can implement risk-based pricing, which in turn can be carried out by utilizing one or more risk model(s) corresponding to the embodiment, as illustrated herein. Accordingly, an investor who places value on an increased long-term average rate of return and has a tolerance for increased short-term volatility may find the additional consideration associated with providing the desired accounting treatment, etc., attractive. Illustratively, such investors can include, but are not limited to, defined-benefit pension plans (including state and local government pension plans) and high-net-worth individuals.

A computer implementation of such an embodiment can be carried out in a number of variations, as may be desired for one application or another. Illustratively, the classes of ownership interest embodiment can be exemplified as a method of using an apparatus, the method including: 1) storing in memory 52 data specifying an agreement by which a first class of ownership interest is obligated to pay consideration to at least one other class of ownership interest in exchange for the at least one other class of ownership interest incurring risk exposure to at least one specified risk associated with the first class of ownership interest and whereby realizing a loss associated with the risk exposure is contingent upon occurrence of at least one specified event; 2) determining, by a digital computer accessing the memory 52 and receiving market data corresponding to an investment associated with the first class of ownership interest, an amount of the risk exposure and an amount of the consideration; and 3) outputting, by the computer, at least one of the amounts. Apparatus (including system) and article implementations can also be used.

Such an embodiment can provide processing such that the first class of ownership interest a desired accounting treatment—e.g., accounting for the value of an investment portfolio at a contract value (or, interchangeably, a book value or stable value) rather than at market value—the risk exposure of the at least one other class of ownership interest can equal the excess, if any, of the contract value (book value, stable value) over the market value of the investment portfolio.

As may be preferred in one implementation or another, if the first class of ownership interest is an ownership interest in a separate account life insurance policy (as in Bank Owned Life Insurance and Corporate Owned Life Insurance), the specified event can be a qualifying (under the terms of the agreement) surrender of the policy.

In another implementation, if the first class of ownership interest is in a stable value investment fund (e.g., within a 401k plan), the specified event can be net withdrawals in excess of market value.

In yet another approach, it may be desired that the first class of ownership interest has an agreement with more than one other class of ownership interest—e.g., the agreement is such that the at least one other class of ownership interest comprises at least two other classes of ownership interest. Or, the first class of ownership interest can have more than one agreement with respectively at least one other class of ownership interest. In this event the more than one other class of ownership interests can be exposed to tiers of a specified risk, to different specified risks, or any combination thereof.

An embodiment may further include receiving data corresponding to the occurrence, and determining from the data corresponding to the occurrence whether the occurrence has occurred, and if the occurrence has occurred, determining an amount of the loss; and outputting the amount of the loss.

Depending on the desired implementation, the amount of the loss may or may not equal the loss exposure at the time of the occurrence of the specified event. For example, if the loss exposure is the excess of contract value over market value and the specified event is the qualifying surrender of an insurance policy, the agreement can specify that in the event of a qualifying surrender, the investment portfolio will be liquidated, that the proceeds will be invested in a money market fund and that the loss amount payable will be the difference between contract value at the time of surrender and the value of the money market fund investment one year after the surrender.

The specified risk can be one or more variety of risk—e.g., it may be that the agreement is such that the at least one specified risk includes at least one of an interest rate risk, a price risk, a liquidity risk, an inflation risk, a credit risk, a currency risk, and a benefit guarantee risk.

In another variation, the first class of ownership interest and the at least one other class of ownership interest are different classes of ownership in the same entity. For example, the first class of ownership interest and the at least one other class of ownership interest can be classes of ownership interest in the same partnership, limited liability fund, investment fund, etc. If they are different classes of interest in a partnership (or a limited liability company that elects to be taxed as a partnership), it is possible for the at least one other class of ownership interest to provide the first class of ownership interest the desired accounting treatment (e.g., valuing a portfolio of securities at contract value rather than market value) through the use of hypothetical liquidation accounting.

In an implementation, it may be desired that the first class of ownership interest and the at least one other class of ownership interest are classes of ownership in different entities. For example, the first class of ownership interest can be a class of ownership interest in a stable value fund and the at least one other class of ownership interest can be a class of ownership interest in an other investment fund (e.g., a hedge fund, a defined-contribution pension fund, etc.).

It may be desired that the first class of ownership interest is one of more than one class of ownership interest in a partnership. In which case, the at least one other class of ownership interest may or may not be a different class of ownership interest in the same partnership, depending on the implementation preferred for the situation of interest.

In another variation, the first class of ownership interest is an interest in a partnership, and the partnership has only one class of ownership interest in the partnership.

In yet another variation, the first class of ownership interest is one of more than one class of ownership interest in a limited liability company. In which case, the at least one other class of ownership interest may or may not be a different class of ownership interest in the same limited liability company, depending on the implementation preferred for the particular circumstances of the implementation.

In a limited liability approach, it may be that the first class of ownership interest is an interest in a limited liability company, and the limited liability company has only one class of ownership interest in the limited liability company.

In another variation, the first class of ownership interest is one of more than one class of ownership interest in an investment fund. In which case, the at least one other class of ownership interest may or may not be a different class of ownership interest in the same investment fund, as may be preferred under the particular circumstances of implementation.

Another variation can be carried out with the first class of ownership interest is an ownership interest in an investment fund, and the investment fund has only one class of ownership interest in the investment fund.

Again, variations in implementation can be carried out, for example, that: the investment fund is an investment fund registered with the SEC; the investment fund is an investment fund not registered with the SEC; the investment fund is a closed-end fund; the investment fund is an open-end fund; the investment fund is an exchange-traded fund; or that the investment fund is a hedge fund. Each has particular attributes which may be preferred in one or another particular situation.

By way of more examples of variations, consider that: the first class of ownership interest can be a class of ownership interest in an investment division of a separate account of an insurance company; the first class of ownership interest can be an ownership interest in a separate account insurance policy; or the first class of ownership interest can be an ownership interest within a retirement plan.

In such situations, an implementation may be such that the retirement plan: includes an elective deferral provision; is a defined-contribution pension plan; is a defined-benefit pension plan; is a cash-balance pension plan; is an IRA; is an ownership interest within a profit sharing plan; or is an ownership interest within a profit sharing plan in which there is an elective deferral provision.

In other variations, the first class of ownership interest is an ownership interest within an employee stock ownership plan (ESOP) or is an ownership interest within an employee stock ownership plan (ESOP) in which there is an elective deferral provision.

In yet another variation, the at least one other class of ownership interest is one of more than one class of ownership interest in a partnership or that it is an ownership interest in a partnership, and the partnership has only one class of ownership interest in the partnership.

In still another variation, the at least one other class of ownership interest is one of more than one class of ownership interest in a limited liability company or that it is an ownership interest in a limited liability company, and the limited liability company has only class of ownership interest in the limited liability company.

In an additional variation, the at least one other class of ownership interest is one of more than one class of ownership interest in an investment fund or that it is an ownership interest in an investment fund, and the investment fund has only class of ownership interest in the investment fund.

As may be desired in one variation or another, the investment fund is: registered with the SEC; not registered with the SEC; a closed-end fund; an open-end fund; an exchange-traded fund; or a hedge fund.

Likewise, as may be desired in one variation or another, it may be that the at least one other class of ownership interest is: a class of ownership interest in an investment division of a separate account of an insurance company; an ownership interest in a separate account insurance policy; or an ownership interest within a retirement plan.

Again, an implementation may be carried out such that the retirement plan: includes an elective deferral provision; is a defined-contribution pension plan; is a defined-benefit pension plan; is a cash-balance pension plan; is an IRA; or a Roth IRA.

Another approach is to have the at least one other class of ownership interest be an ownership interest within a profit sharing plan or that it be an ownership interest within a profit sharing plan in which there is an elective deferral provision.

In variations, the at least one other class of ownership interest is an ownership interest within an employee stock ownership plan (ESOP) or that the at least one other class of ownership interest is an ownership interest within an employee stock ownership plan (ESOP) in which there is an elective deferral provision.

In yet further variations, it may be that: the first class of ownership interest is a class of ownership interest in a partnership and the at least one other class of ownership interest is an other class of ownership interest in the partnership; the first class of ownership interest is a class of ownership interest in a limited liability company and the at least one other class of ownership interest is an other class of ownership interest in the limited liability company; or the first class ownership interest is a class of ownership interest in an investment fund and the at least one other class of ownership interest is an other class of ownership interest in the investment fund.

More variations can be carried out such that the first class of ownership interest is an ownership interest in at least one marketable security or in a portfolio of marketable securities. The at least one other class of ownership interest can be an ownership interest in at least one marketable security or in a portfolio of marketable securities.

The specified risk, or risks, can include any category of financial risk. Illustratively, the specified risk can be: an interest rate risk associated with the first ownership interest; a credit risk associated with the first ownership interest; a price risk associated with the first ownership interest; a liquidity risk associated with the first ownership interest; an inflation risk associated with the first ownership interest; a currency risk associated with the first ownership interest; a Guaranteed Minimum Accumulation Benefit embedded in the first ownership interest and wherein, the first ownership interest is an ownership interest in a deferred annuity; a Guaranteed Minimum Death Benefit embedded in the first ownership interest and wherein, the first ownership interest is an ownership interest in a deferred annuity; a Guaranteed Minimum Income Benefit embedded in the first ownership interest and wherein, the first ownership interest is an ownership interest in an annuity; a Guaranteed Minimum Withdrawal Benefit embedded in the first ownership interest and wherein, the first ownership interest is an ownership interest in an annuity; or a Guaranteed Minimum Purchasing Power Benefit embedded in the first ownership interest and wherein, the first ownership interest is an ownership interest in an annuity.

The agreement between the first class of ownership interest and an other class of ownership interest can specify one category of risk (e.g., an interest rate risk associated with the first class of ownership interest) and one specified event (e.g., a qualifying surrender of an insurance policy) or it can specify more than one category of risk (e.g., an interest rate risk and a credit risk). It can specify one variety of specified event (e.g., a qualifying surrender of an insurance policy) or more than one specified event (e.g., a net withdrawal exceeding a specified amount and a conversion of a deferred annuity into an immediate annuity).

The specified event, or events, can include any variety of event. So for example, the specified event can be a qualifying surrender of an insurance contract or a withdrawal event from a stable value fund. It can be that the withdrawal event is a net withdrawal from the stable value fund or that it is a net withdrawal in excess of the market value of the assets of the stable value fund.

In some embodiments, there can be a storing, in the memory 52, of a stable value process and use of the stored process in determining at least one of the amounts, such as determining a stable value return and/or a contract value of the first class of ownership interest. Determining the amount of the at least one specified risk can include calculating the difference between contract value and market value of the first ownership interest.

Additionally, variations can be such that there are at least two other classes of ownership interest and that the at least two other classes of ownership interest are different classes of ownership interest in the same entity, or that they are classes of ownership interest in different entities. It can be that there are more than two other classes of ownership interest and that some are different classes of ownership interest in the same entity and that an other (or others) are classes of ownership interest in different entities.

In additional variations, it can be that there are at least two other classes of ownership interest and the at least one other class of ownership interest comprises at least two other classes of the ownership interest, and the first class of ownership interest is obligated to pay compensation to each of the at least two other classes of ownership interest in return for each of the at least two other classes of ownership interest incurring the risk exposure. Further, it can be that risk exposure corresponds to a respective risk exposure for each of the at least two other classes of the ownership and is within a category of risk exposure, the category specified by the agreement, and the risk exposure of each of the at least two other classes of ownership interest are in the category of risk exposure. Still further, the respective risk exposures can represent discrete tiers of risk.

Given at least two other classes of ownership interest, risk exposure can correspond to a respective risk exposure for each of the at least two other classes of the ownership and each of the respective risk exposures being in a respective category of risk exposure, the categories specified by the agreement. Further, the specified event can be within a variety of specified events, the variety specified by the agreement, and wherein each of the respective risk exposures is contingent on the variety of specified events. Still further, the specified event can be within one of a plurality of varieties of specified events, the varieties specified by the agreement, and wherein each of the respective risk exposures is contingent on a different one of the varieties of specified events.

An illustrative apparatus of an exemplary embodiment can comprise: memory 52 storing data specifying an agreement by which a first class of ownership interest is obligated to pay consideration to at least one other class of ownership interest in exchange for the at least one other class of ownership interest incurring risk exposure to at least one specified risk associated with the first class of ownership interest and whereby realizing a loss associated with the risk exposure is contingent upon occurrence of at least one specified event; a digital computer determining, by accessing the memory 52 and receiving market data corresponding to an investment associated with the first class of ownership interest, an amount of the risk exposure and an amount of the consideration; and an output device, operably associated with the computer, outputting at least one of the amounts.

The apparatus and manner of its use may further include a second computer interacting with the digital computer, in carrying out the agreement or a second computer exercising control and over said apparatus, so as to benefit from said control. For example, an entity can digitally exercise control and benefit over apparatus located distant from the entity, a computing configuration explicitly contemplated as within the scope of embodiments herein.

Any of the embodiments, implementations, or variations herein can be manifested in any such an apparatus, e.g., computer.

Illustratively, from a different perspective, there can be an apparatus comprising a digital computer programmed to carry out the operations of: storing in memory 52, operably associated with the computer, data specifying an agreement by which a first class of ownership interest is obligated to pay consideration to at least one other class of ownership interest in exchange for the at least one other class of ownership interest incurring risk exposure to at least one specified risk associated with the first class of ownership interest and whereby realizing a loss associated with the risk exposure is contingent upon occurrence of at least one specified event; determining, by accessing the memory 52 and receiving market data corresponding to an investment associated with the first class of ownership interest, an amount of the risk exposure and an amount of the consideration; and outputting, by the computer, at least one of the amounts.

From another perspective, there can be a computer readable medium storing executable instructions, which when retrieved and executed on a digital computer, causes the digital electrical computer to perform the operations of: storing in memory 52, operably associated with the computer, data specifying an agreement by which a first class of ownership interest is obligated to pay consideration to at least one other class of ownership interest in exchange for the at least one other class of ownership interest incurring risk exposure to at least one specified risk associated with the first class of ownership interest and whereby realizing a loss associated with the risk exposure is contingent upon occurrence of at least one specified event; determining, by accessing the memory 52 and receiving market data corresponding to an investment associated with the first class of ownership interest, an amount of the risk exposure and an amount of the consideration; and outputting, by the computer, at least one of the amounts. Any of the embodiments, implementations, or variations herein can be manifested in such a medium.

The medium can include at least one of a RAM, a ROM, a disk, an ASIC, and a PROM.

The embodiment presented in FIG. 7 may be implemented on at least one essentially digital processing apparatus. The processing apparatus(es) may be associated with one or more of the entities depicted in FIG. 1. If more than one processing apparatus is implementing the embodiment, the processing apparatuses may work interdependently, independently, or some combination of both, noting again the control and benefit locus embodiments.

FIG. 7 is a flow chart of an illustrative embodiment. In FIG. 7, there is a storing in memory 52 data specifying an agreement by which a first class of ownership interest is obligated to pay consideration to at least one other class of ownership interest in exchange for the at least one other class of ownership interest incurring risk exposure to at least one specified risk associated with the first class of ownership interest and whereby realizing a loss associated with the risk exposure is contingent upon occurrence of at least one specified event 500. Determining, by a digital computer accessing the memory 52 and receiving market data corresponding to an investment associated with the first class of ownership interest, an amount of the risk exposure and an amount of the consideration 502. Outputting, by the computer, at least one of the amounts 504. Receiving data corresponding to the occurrence, and determining from the data corresponding to the occurrence whether the occurrence has occurred, and if the occurrence has occurred, determining an amount of the loss 506. Outputting, by the computer, the amount of the loss 508.

In yet another exemplary embodiment (FIG. 8), a computer-aided process for specified event swaps is utilized to: 1) provide the desired accounting treatment, etc.; and/or 2) hedge positions and manage risk in the marketplace for providing the desired accounting treatment and/or other assumption of risk.

Specified event swaps may apply to a specific security or securities or to entire portfolios of policyholders and/or protection buyers (or other investors). They may apply to only securities owned by one policyholder and/or protection buyer or investor or they may apply to securities owned by groups of policyholders and/or protection buyers or investors. If the securities are owned by groups of policyholders and/or protection buyers or investors, there may be more than one specified event—any, all, or none of which may occur.

The specified event swaps may be sold in any form of market, including, but not limited to: 1) a pure over-the-counter market; 2) a modified over-the-counter market (e.g., an over-the-counter market that also includes a central clearing house and/or a process for managing counterparty risk); 3) an organized exchange; and/or 4) an electronic trading system.

The exemplary embodiment presented in FIG. 8 may be implemented on at least one processing apparatus. The processing apparatus(es) may be associated with one or more of the entities depicted in FIG. 1. If more than one processing apparatus is implementing the embodiment, the processing apparatuses may work interdependently, independently, or some combination of both.

FIG. 8 is a flow chart of this exemplary embodiment. A methodology for managing counterparty risk 600 is established. In a pure over-the-counter market, this methodology may be informal and ad-hoc (e.g., each party to a contract decides on their own, based on a credit risk assessment of the counterparty, whether or not the counterparty risk is acceptable and whether or not collateral must be posted and, if so, how much). A problem with this methodology is that (as has happened during the current credit crisis), the credit quality of a counterparty may deteriorate drastically during the life of a contract, thus introducing severe counterparty risk into a system that has no process for remedying the situation.

In an organized market, the methodology for managing counterparty risk may be very formal with strict requirements that virtually eliminate counterparty risk (e.g., daily mark-to-market requirements together with margin requirements that can be satisfied only with very liquid, high-quality securities such as Treasury bills).

Although these strict requirements may virtually eliminate counterparty risk, they may impose significant costs on market participants, thus reducing the utility and value of the market.

Intermediate approaches such as modified over-the-counter market with a central clearing house (like an organized market) but with a more flexible methodology for managing counterparty risk may be able to provide the best of both a pure over-the-counter market (maximum flexibility) with the best of an organized exchange (transparency, netting of transactions and virtual elimination of counterparty risk). A possible methodology for minimizing counterparty risk and costs while maximizing flexibility is presented in U.S. Patent Application Publication No. 2004/0225536 "Superstructure pool processing apparatus," Schoen, Matthew B., et al., Nov. 11, 2004, the content of which is hereby incorporated by reference in its entirety.

Contract terms are agreed upon 602, the contract is priced 604, and the contract is executed 606. The process for managing counterparty risk is implemented 608 (if applicable) and fees are paid 610 as per the fee schedule.

If a specified event occurs 612, the swap amount is determined and paid 614. If a specified event does not occur 612, the contract will expire 616 at the end of its life. If the specified event swap includes a number of different specified events (e.g., multiple policyholders, each of which may or may not choose to surrender their policies), it may be that some specified events occur and others do not. For those specified events that do occur, the swap amount will be paid and for those that do not, that portion of the contract will expire.

Yet another exemplary embodiment (FIG. 9) is a computerized configuration to implement a bond indenture for a bond, the indenture including a contingent liability obligation whereby the an issuer of the bond is obligated to pay an investor in the bond if a specified event occurs. In such an embodiment the Specified Event Bond can provide investors in the bond the desired accounting treatment and/or other assumption of risk. For example, the contingent liability obligation can allow the purchaser of the bond to account for the investment in the bond at a contract value (also, depending on the context, can be referred to as a "stable value" or "book value") rather than at market value.

In addition to providing the desired accounting treatment, etc., the Specified Event Bonds can provide policyholders and/or protection buyers with a desired asset classification (e.g., bank-eligible investments) while providing the policyholder and/or protection buyer with returns linked to the returns on other assets (e.g., stocks, hedge funds, etc.) that the policyholder and/or protection buyer may not be allowed to hold. This ability to provide a desired asset classification can allow the policyholder and/or protection buyer to improve diversification by investing in assets whose returns are relatively uncorrelated to other holdings—thus reducing portfolio risk—and/or increase expected returns.

The ability of Specified Event Bonds to provide policyholders and/or protection buyers (and other investors) with a desired asset classification can include the ability to create new types of investments within an asset classification while also providing the desired accounting treatment, etc.

For example, a policyholder and/or protection buyer (or other investor) may desire to hold investments that fall into the category of high-yield bonds in order to increase effective diversification (because the returns on high-yield bonds vary somewhat differently than the yields on investment-grade bonds) but is unwilling and/or unable to invest directly into high-yield bonds due to their default risk. The policyholder and/or protection buyer (and/or investor) can use specified event bonds to obtain the desired pattern of returns (i.e., returns tied to the returns on high-yield bonds) together with the desired credit quality (investment grade)—plus the desired accounting treatment, etc.

Specified Event Bonds can be issued by corporations or other entities, with or without credit enhancements (e.g., collateral, bond insurance, specified event swaps, specified event put options, etc.) that provide the desired credit quality and assure the provision of the desired accounting treatment, etc. Property and liability insurance companies may find Specified Event Bond financing to be attractive given its potential inverse relationship to the CAT bonds that they presently issue.

Corporations (financial and nonfinancial) that are major borrowers in the bond markets may find the lower borrowing cost made possible by Specified Event Bonds to be attractive. The probability of a specified event is small, and if the specified event should occur, it likely would impact only a part of the bond issue, For example, if the specified event is a qualifying surrender of an insurance policy or a withdrawal event from a stable value fund, it is unlikely that the entire bond issue would be held by the investor experiencing the specified event. Further, the size of the contingent liability obligation (and the payment amount to be made in the event of an occurrence) can be kept relatively small relative to the amount of the bond issue by defining the contingent liability obligation to be the difference between the contract value of the bond and the market value of the bond rather than the amount required to redeem the bond at the contract value.

Investment funds may also issue Specified Event Bonds in order to leverage their returns in a manner that, for long-term investors in the fund, may increase expected long-term returns with relatively little (as compared to traditional margin financing) increase in long-term risk—although the variability of returns in the short-term may increase significantly.

Risk can be reduced as compared to traditional margin financing because: 1) the Specified Event Bond financing is long-term, rather than short-term (thus making it possible to eliminate the risk of margin calls and/or problems in rolling over the financing); and/or 2) the returns on the specified event bond financing may be tied to the returns on the underlying assets being financed using a stable value process, further reducing risk for the investors in the fund. Further, the fund managers may, if they so desire, reduce or eliminate the risk of providing the desired accounting treatment, etc. through the purchase of specified event swaps, specified event put options, other derivatives, insurance and/or reinsurance.

As in the case of the Specified Event Bonds of other issuers, investment funds may issue Specified Event Bonds with or without credit enhancements (e.g., collateral, bond insurance, specified event swaps, specified event put options, etc.) that provide the desired credit quality and assure the provision of the desired accounting treatment, etc. Conservatively managed funds using lower levels of leverage may not require credit enhancements of any kind. More aggressive funds using more leverage may find it necessary and/or desirable to employ one or more credit enhancements—possibly including those that may moderate or eliminate the specified event risk (e.g., specified event swaps, specified event put options, other derivatives, insurance and/or reinsurance).

Consider an S & P 500 index fund that leverages its portfolio with long-term (e.g., 20 years plus) Specified Event Bonds whose returns are linked to the total return on the S & P 500. Pension funds (including the pension funds of state and local governments that may not be subject to the expected accounting rules changes coming for corporate pension funds) and other long-term investors who are willing and able to commit funds for the long-term (e.g., 20 plus years) may be able to lock in long-term returns significantly in excess of the long-term return on the S & P 500 with very little, if any, increase in long-term risk because the return on the specified event bonds may be tied to, but less than, the return on the S & P 500.

The return on the Specified Event Bonds may be less than the return on the S & P 500 because of: 1) the lower risk of the Specified Event Bonds as compared to the S & P 500; and/or, 2) the value to investors of the ability to account for their investment in the bonds at their contract value rather than at market value.

There may be virtually no limit to the asset classification abilities of Specified Event Bonds. For example, Specified Event Bonds may be used to create fixed (and/or minimum) nominal return assets, fixed (and/or minimum) real return assets that provide the desired accounting treatment, etc. This capability may make them attractive investments for insurance companies offering guaranteed minimum accumulation benefit (GMAB), guaranteed minimum death benefit (GMDB), guaranteed minimum income benefit (GMIB), and/or guaranteed minimum withdraw (GMWB) variable annuity policies.

Given the diversification benefits that may be created by fixed real return assets, Specified Event Bonds with fixed real returns may be especially attractive to policyholders (and other investors)—especially since the real return asset class is presently limited mostly to TIPS, which have zero default risk but have low real returns (and significant price volatility).

Corporations financing real assets may find it attractive to issue fixed real return Specified Event Bonds. If desired, they may reduce or eliminate the specified event risk through the purchase of specified event swaps and/or specified event put options.

Investment funds that invest in the shares of equity REITs may find it attractive to leverage their holdings with fixed real return specified event bonds. The fixed real return may increase their risk somewhat relative to the use of Specified Event Bonds whose returns are linked to the total returns on their investment portfolio, but the fixed real return may be less than the expected real return on Specified Event Bonds whose returns are linked to the returns on the investment portfolio, thus increasing the expected return for the investors in the fund.

A computer implementation of such an embodiment can be carried out in a number of variations, as may be desired for one application or another. Illustratively, the Specified Event Bond embodiment can be exemplified as a method of using an apparatus, the method including: 1) storing in memory 52 terms of a bond indenture for a bond, the indenture including a contingent liability obligation whereby an issuer of the bond is obligated to pay to an investor in the bond if a specified event occurs; 2) determining, by a computer accessing the memory 52 and receiving market data, an amount of contingent liability corresponding to the obligation; and, 3) outputting, by the computer, the determined amount of the contingent liability.

An embodiment may further include receiving data corresponding to the specified event and determining from the data corresponding to the specified event whether there has been an occurrence of the specified event, and if an occurrence is determined, computing a payment amount to be made in response to the occurrence, and outputting the payment amount.

Depending on the desired implementation, the payment amount may or may not equal the amount of the contingent liability at the time of the occurrence of the specified event. For example, if the specified event occurs for some, but not all, of the bond holders, the payment amount will X percent of the amount of the contingent liability, where X is the percent of the bond issue held by investors experiencing the specified event.

In another variation, the determining includes determining, from the received data, an estimated market value for the bond. One method of estimating the market value of a Specified Event bond is to determine the current market interest rate on comparable (with the possible exception of the contingent liability obligation) bonds and use that interest rate to find the present value of the scheduled payments of the Specified Event bond.

In yet another variation, the specified event includes at least one of a qualifying surrender of an insurance policy and a redemption event associated with a stable value fund.

In still another variation, the contingent liability is a redemption payment for the bond. And in another, the amount of the contingent liability is a face value of the bond.

In yet another variation, the determining includes calculating the difference between a face value of the bond and a market value of the bond.

In still another variation, a stable value process is stored and the determining of the amount of the contingent liability includes implementing the stable value process. Yet another included further determining, from the received data, a contract value of the bond. In still another, the amount of the contingent liability is equal to the contract value of the bond. In yet another the determining the amount of the contingent liability includes calculating a difference between the contract value and a market value of the bond. In still another, the determining the amount of the contingent liability includes calculating a difference between the contract value and a market value corresponding to a specified portfolio of marketable securities.

Yet another variation further includes storing a minimum rate of return for the investor in the bond, and determining the amount of the contingent liability corresponding to the minimum rate of return. In still another, the minimum rate of return is a constant dollar return. In yet another, an inflation measure for the minimum constant dollar rate of return is a consumer price index for urban consumers.

In yet another variation the bond indenture is a bond indenture for a bond having a non-financial corporation as an issuer of the bond.

In still another variation the bond indenture is a bond indenture for a bond having a government entity as an issuer of the bond. In yet another the government entity is a federal government entity. In still another the government entity is an agency of a federal government. In yet another the government entity is a municipal government. In still another the government entity is an agency of a municipal government.

In yet another variation the bond indenture is a bond indenture for a bond having a financial corporation as an issuer of the bond. In still another the financial corporation is a finance company. In yet another the financial corporation is a leasing company. In still another the financial corporation is a bank holding company. In still another the financial corporation is an investment banking company. In yet another the financial corporation is an insurance company. In still another variation the financial corporation is an insurance holding company.

In still another variation the bond indenture is a bond indenture for a bond having a partnership as an issuer of the bond. In yet another the bond indenture is a bond indenture for a having a limited liability company as an issuer of the bond. In still another the bond indenture for the bond is a bond indenture for a bond having a trust as an issuer of the bond. In yet another variation the bond indenture for the bond is a bond indenture for a bond having a real estate investment trust as an issuer of the bond.

In still another variation the bond indenture for the bond is a bond indenture for a bond having a defined benefit pension plan as an issuer of the bond.

In yet another variation the bond is a bond indenture for a bond having an investment fund as an issuer of the bond. In still another the investment fund is an SEC-registered investment fund. In yet another the investment fund is not an SEC-registered investment fund. In still another the investment fund is a closed-end fund. In still another the investment fund is an open-end fund. In yet another the investment fund is an exchange-traded fund. In still another the investment fund is a hedge fund. In yet another the investment fund is a private equity fund.

In still another variation the bond indenture for the bond is a bond indenture for a bond having an investment division of a separate account of an insurance company as an issuer of the bond.

In yet another variation the specified event is a qualifying surrender of an insurance policy. In still another the specified event is a withdrawal event from a stable value fund. In yet another the withdrawal event is a withdrawal amount greater than a market value of securities in the stable value fund. In yet another the withdrawal event is an amount of net withdrawal occurring within a period of time.

An illustrative apparatus of an exemplary embodiment can comprise: memory 52 storing terms of a bond indenture for a bond, the indenture including a contingent liability obligation whereby an issuer of the bond is obligated to pay to an investor in the bond if a specified event occurs; a digital computer determining, by accessing the memory 52 and receiving market data, an amount of contingent liability corresponding to the obligation; and an output device, outputting the determined amount of the contingent liability.

The apparatus and manner of its use may further include a second computer interacting with the digital computer, in carrying out the agreement or a second computer exercising control and over said apparatus, so as to benefit from said control. For example, an entity can digitally exercise control and benefit over apparatus located distant from the entity, a computing configuration explicitly contemplated as within the scope of embodiments herein.

Any of the embodiments, implementations, or variations herein can be manifested in any such apparatus.

Illustratively, from a different perspective, there can be an apparatus comprising a digital computer programmed to carry out the operations of: storing in memory 52 terms of a bond indenture for a bond, the indenture including a contingent liability obligation whereby an issuer of the bond is obligated to pay to an investor in the bond if a specified event occurs; determining, by accessing the memory 52 and receiving market data, an amount of contingent liability corresponding to the obligation; and outputting the determined amount of the contingent liability.

From another perspective, there can be a computer readable medium storing executable instructions, which when retrieved and executed on a digital computer, causes the digital electrical computer to perform the operations of: storing in memory 52 terms of a bond indenture for a bond, the indenture including a contingent liability obligation whereby an issuer of the bond is obligated to pay to an investor in the bond if a specified event occurs; determining, by accessing the memory 52 and receiving market data, an amount of contingent liability corresponding to the obligation; and outputting the determined amount of the contingent liability.

The medium can include at least one of a RAM, a ROM, a disk, an ASIC, and a PROM.

The embodiment presented in FIG. 9 may be implemented on at least one essentially digital processing apparatus. The processing apparatus(es) may be associated with one or more of the entities depicted in FIG. 1. If more than one processing apparatus is implementing the embodiment, the processing apparatuses may work interdependently, independently, or some combination of both.

FIG. 9 is a flow chart of an illustrative embodiment. In FIG. 9 there is a storing in memory 52 terms of a bond indenture for a bond, the indenture including a contingent liability obligation whereby an issuer of the bond is obligated to pay an investor in the bond if a specified event occurs 700. Determining, by a digital computer accessing the memory 52 and receiving market data, an amount of a contingent liability corresponding to the obligation 702. Outputting, by the computer, the determined amount of the liability 704. Receiving data corresponding to the specified event and determining from the data corresponding to the specified event whether there has been an occurrence of the specified event, and if an occurrence is determined, computing a payment amount to be made in response to the occurrence, and outputting the payment amount 706.

Yet another exemplary embodiment (FIG. 9A) is a computerized configuration to implement a bond indenture for a bond, the indenture whereby proceeds from the bond are placed in a bankruptcy-remote entity, an investment is purchased, a risk associated with the investment is hedged, and a scheduled investor payment is adjusted if a specified event occurs. In such an embodiment, issuers of the bond can use the Hedged Specified Event Bond to reduce and manage risks associated with the specified event. Issuers of the bond who are regulated entities (e.g., bank holding companies, insurance companies, etc.) can use the Hedged Specified Event to reduce their statutory capital requirements.

For investors in the Hedged Specified Event bond, credit risk can be eliminated by a requirement to place the bond proceeds in a bankruptcy-remote entity and invest the proceeds in U.S. government securities. This elimination of credit risk, together with the hedging of a risk associated with the investment by the bond issuer can produce an investment for the bond holder that has unique and attractive features.

For an illustrative possible example, consider a Hedged Specified Event bond issued by a provider of stable value protection (SVP) with a five year maturity in which the proceeds are placed in a bankruptcy remote entity, invested in U.S. Government securities with a maturity of about the same maturity at the life of the bond (5 years) with the interest rate risk on the 5 year U.S. government securities hedged by the purchase of put options of Treasury Bonds (and/or Treasury Bond futures)—with the cost of the hedge paid for by the bond issuer—where the specified event is a loss event for the provider of SVP in which the loss is greater than a specified amount and, given the occurrence of the specified event, the scheduled principal payment on the bond is reduced by the lesser of the excess of the bond issuer's SVP over the specified amount and the face value of the bond.

For a bond holder, an investment in the Hedged Specified Event bond is a zero credit risk investment with an expected return (the 5 year Treasury rate plus the returns on the Treasury bond put options) that is protected from both declines and increases in the rate of interest. If interest rates decline, the investor in the bond has locked in a return at least equal to the 5 year Treasury rate (Treasury bonds are not callable). If interest rates increase, the return on the put options can be expected to drive up the investors' total return (interest on the 5 year Treasuries plus the profits on the put options). Indeed, given the extreme interest rate scenario (rapidly rising interest rates over the life of the bond) that is most likely to result in the occurrence of the specified event, the profits on the put options could be such that the bond investors minimize, or even avoid losing principal even given the occurrence of the specified event.

A computer implementation of such an embodiment can be carried out in a number of variations, as may be desired for one application or another. Illustratively, the Hedged Specified Event bond embodiment can be exemplified as a method of using an apparatus, the method including: 1) storing in memory 52 terms of a bond indenture whereby proceeds from the bond are placed in a bankruptcy-remote entity, an investment is purchased, a risk associated with the investment is hedged (or a risk associated with the occurrence of the specified event), and a scheduled investor payment is adjusted if a specified event occurs; 2) determining, by a digital computer accessing the memory 52 and receiving market data and data corresponding to the specified event, a payment amount to the entity, a scheduled investor payment amount by the entity, a value of assets of the entity, whether there has been an occurrence of the specified event, and if an occurrence is determined, computing an adjustment in the scheduled payment; and 3) outputting, by the computer, at least one of the payment amount to the entity, the scheduled investor payment amount, the value, and, if the occurrence is determined, the adjustment.

In a variation of the embodiment, the adjustment is at least one of a suspension of the scheduled investor payment amount, a forgiveness of the scheduled investor payment amount, a delay in the scheduled payment amount, a reduction in the scheduled payment amount, a temporary lien against the scheduled payment amount, and a conversion of the bond into a specified number of equity shares.

For an illustrative possible example of a bond indenture in which the adjustment may include temporary lien against the scheduled payment, consider an insurance company that has written variable annuity policies that include a guaranteed minimum income benefit. In the event of temporary market downturns, this benefit guarantee may result in a statutory capital shortfall for the insurance company, even though any actual possible loss as a result of the guarantee is in the future and, by the time that it might be realized, the market may have recovered, thus eliminating any actual loss. By issuing Hedged Specified Event bonds in which the adjustment includes a temporary lien against the principal payment of the bond (where the principal payment is guaranteed by the U.S. government securities held in the bankruptcy-remote entity), subject to regulatory approval, can eliminate the shortfall in statutory capital that would otherwise have occurred and thus avoid having to raise expensive capital at a time when the carrier itself may be subject to a drop in ratings and therefore subject to higher capital costs (possibly amplified by down markets, further increasing the cost of capital). For the investors in the bond, the temporary lien is a modest risk as the market will most likely have recovered before it would have been exercised, thus eliminating the lien and allowing bondholders to ultimately recover some or even all of their principal (which is a huge improvement of other event linked bonds, e.g., catastrophe bonds). For the bond issuer, there is a possibility that regulators will embrace the lien as being the dollar equivalent of regulatory capital because as long as the annuity related loss exposure remains, there is collateral available absent credit risk (the same U.S. government securities held in the bankruptcy-remote entity which until the specified event occurred negated credit risk for the bond investors).

For an illustrative example of a bond indenture in which the adjustment is a conversion of the bond into a specified number of equity shares, consider a bank holding company seeking to protect against the need to raise equity capital at a time when down markets make the capital more expensive than normal. By issuing Hedged Specified Event bonds in which the adjustment is a conversion of the principal amount of the bond into a specified number of equity shares and the specified event is a specified shortfall of the bank holding company's capital relative to regulatory requirements (or such other specified event acceptable to investors), the bank holding company can lock in the ability to raise future equity capital at a known cost and possibly avoid a need to raise equity capital at a high cost due to market conditions. For the investors in the bond, they can, in the event that the specified event occurs, receive the hedging profits (amounts in excess of the required collateral) earned by the bankruptcy-remote entity in addition to the contractual number of equity shares.

In yet another variation of the embodiment, the investment of the proceeds is an investment in one or more government securities. In still another variation the government securities are U.S. government securities with a maturity equal to a maturity of the bond.

In yet still another variation the risk being hedged is an interest rate risk. In still another the risk is a price risk. In yet another the risk is a liquidity risk. In still another the risk is an inflation risk. In yet another the risk is a currency risk.

In still another variation, the investment is hedged by purchasing a put option. In yet another the investment is hedged by using a futures contract. In still another the investment is hedged by using a forward contract. In yet another the investment is hedged using a swap contract. In still another the investment is hedged purchasing a swaption.

In yet another variation the specified event is a loss amount on a wrap agreement written by an issuer of the bond. In still another, the specified event is a loss amount on an insurance policy written by an issuer of the bond. In yet another, the loss amount comprises a guaranteed minimum accumulation benefit amount. In still another, the loss amount comprises a guaranteed minimum death benefit amount. In yet another, the loss amount comprises a guaranteed minimum income benefit amount. In still another, the loss amount comprises a guaranteed minimum withdrawal benefit amount. In yet another, the loss amount comprises a guaranteed minimum purchasing power benefit amount. In yet another, the loss amount comprises a natural disaster or other catastrophe (or combination of events), but with losses of principal reduced by hedging of the catastrophic events specified.

An illustrative apparatus of an exemplary embodiment can comprise: memory 52 storing terms of a bond indenture whereby proceeds from the bond are placed in a bankruptcy-remote entity, an investment is purchased, a risk associated with the investment is hedged, and a scheduled investor payment is adjusted if a specified event occurs; a digital computer determining, by accessing the memory 52 and receiving market data and data corresponding to the specified event (e.g., the actual dollar loss incurred as a consequence of the event), a payment amount to the entity, a scheduled investor payment amount by the entity, a value of assets of the entity, whether there has been an occurrence of the specified event, and if an occurrence is determined, computing an adjustment in the scheduled payment; and an output device, outputting at least one of the payment amount to the entity, the scheduled investor payment amount, the value, and, if the occurrence is determined, the adjustment.

The apparatus and manner of its use may further include a second computer interacting with the digital computer, in carrying out the agreement or a second computer exercising control and over said apparatus, so as to benefit from said control. For example, an entity can digitally exercise control and benefit over apparatus located distant from the entity, a computing configuration explicitly contemplated as within the scope of embodiments herein.

Illustratively, from a different perspective, there can be an apparatus comprising a digital computer programmed to carry out the operations of: storing in memory 52 terms of a bond indenture whereby proceeds from the bond are placed in a bankruptcy-remote entity, an investment is purchased, a risk associated with the investment is hedged, and a scheduled investor payment is adjusted if a specified event occurs; determining, by accessing the memory 52 and receiving market data and data corresponding to the specified event, a payment amount to the entity, a scheduled investor payment amount by the entity, a value of assets of the entity, whether there has been an occurrence of the specified event, and if an occurrence is determined, computing an adjustment in the scheduled payment; and outputting at least one of the payment amount to the entity, the scheduled investor payment amount, the value, and, if the occurrence is determined, the adjustment.

Illustratively, from a different perspective, there can be a computer readable medium storing executable instructions, which when retrieved and executed on a digital computer, causes the digital electrical computer to perform the operations of: storing in memory 52 terms of a bond indenture whereby proceeds from the bond are placed in a bankruptcy-remote entity, an investment is purchased, a risk associated with the investment is hedged, and a scheduled investor payment is adjusted if a specified event occurs; determining, by accessing the memory 52 and receiving market data and data corresponding to the specified event, a payment amount to the entity, a scheduled investor payment amount by the entity, a value of assets of the entity, whether there has been an occurrence of the specified event, and if an occurrence is determined, computing an adjustment in the scheduled payment; and outputting at least one of the payment amount to the entity, the scheduled investor payment amount, the value, and, if the occurrence is determined, the adjustment.

The medium can include at least one of a RAM, a ROM, a disk, an ASIC, and a PROM.

The embodiment presented in FIG. 9A may be implemented on at least one essentially digital processing apparatus. The processing apparatus(es) may be associated with one or more of the entities depicted in FIG. 1. If more than one processing apparatus is implementing the embodiment, the processing apparatuses may work interdependently, independently, or some combination of both, noting again the control and benefit locus embodiments. For example, an entity can digitally exercise control and benefit over apparatus located distant from the entity, a computing configuration explicitly contemplated as within the scope of embodiments herein.

FIG. 9A is a flow chart of an illustrative embodiment. In FIG. 9A there is a storing in memory 52 data specifying the terms of a bond indenture whereby proceeds from the bond are placed in a bankruptcy-remote entity, an investment is purchased, a risk associated with the investment is hedged, and a scheduled payment is adjusted if a specified event occurs 710. Determining, by a digital computer accessing the memory 52 and receiving market data and data corresponding to the specified event, a payment amount to the entity, a scheduled investor payment amount by the entity, a value of assets of the entity, whether there has been an occurrence of the specified event, and if an occurrence is determined, computing an adjustment in the scheduled payment 712. Outputting, by the computer, at least one of the payment amount to the entity, the scheduled investor payment amount, and, if the occurrence is determined, the adjustment.

In still another exemplary embodiment (FIG. 10), a computer-aided process for specified event put options is utilized to: 1) provide the desired accounting treatment, etc.; and/or 2) hedge positions and manage risk in the marketplace for providing the desired accounting treatment, etc.

Specified event put options may be used to provide the desired accounting treatment, etc. A policyholder and/or protection buyer, or a group of policyholders and/or protection buyers (and/or other investors) may purchase specified event put options on a bond (or other security) and/or on a portfolio of securities and thereby obtain the desired accounting treatment, etc.

Sellers of the desired accounting treatment, etc. (e.g., SVP providers, funds issuing special classes of shares, writers of specified event swaps, issuers of Specified Event Bonds, writers of specified event put options, etc.) may choose to use specified event put options to limit and/or manage their risk.

For example, an issuer of Specified Event Bonds may purchase specified event put options for all (or some portion) of the Specified Event Bonds that have a strike price that is some function of book value (e.g., 5.0% percent less than book). Purchasing the specified event put options may allow the bond issuer to limit the maximum cash cost of a specified event (e.g., to no more than 5.0% of book value).

SVP providers, managers of funds issuing special classes of shares, writers of specified event swaps, and writers of specified event put options may also use specified event put options to limit and manage their risk.

The specified event put options may be sold in any form of market, including, but not limited to: 1) a pure over-the-counter market; 2) a modified over-the-counter market (e.g., an over-the-counter market that also includes a central clearing house and/or a process for managing counterparty risk); 3) an organized exchange; and/or 4) an electronic trading system.

The exemplary embodiment presented in FIG. 10 may be implemented on at least one processing apparatus. The processing apparatus(es) may be associated with one or more of the entities depicted in FIG. 1. If more than one processing apparatus is implementing the embodiment, the processing apparatuses may work interdependently, independently, or some combination of both.

FIG. 10 is a flow chart of a specified event put option exemplary embodiment. A methodology for managing counterparty risk 800 is established. In a pure over-the-counter market, this methodology may be informal and ad-hoc (e.g., each party to a contract decides on their own, based on a credit risk assessment of the counterparty, whether or not the counterparty risk is acceptable and whether or not collateral must be posted and, if so, how much). A problem with this methodology is that (as has happened during the current credit crisis), the credit quality of a counterparty may deteriorate drastically during the life of a contract, thus introducing severe counterparty risk into a system that has no process for remedying the situation.

In an organized market, the methodology for managing counterparty risk may be very formal with strict requirements that virtually eliminate counterparty risk (e.g., daily mark-tomarket requirements together with margin requirements that can be satisfied only with very liquid, high-quality securities such as Treasury bills).

Although these strict requirements may virtually eliminate counterparty risk, they may impose significant costs on market participants, thus reducing the utility and value of the market.

Intermediate approaches such as modified over-the-counter market with a central clearing house (like an organized market) but with a more flexible methodology for managing counterparty risk may be able to provide the best of both a pure over-the-counter market (maximum flexibility) with the best of an organized exchange (transparency, netting of transactions and virtual elimination of counterparty risk). A possible methodology for minimizing counterparty risk and costs while maximizing flexibility is presented in the aforementioned U.S. Patent Application Publication No. 2004/0225536.

Contract terms are agreed upon 802, the contract is priced 804, and the contract is executed 806. The process for managing counterparty risk is implemented (if applicable) 808 and fees are paid 810 as per the fee schedule.

If a specified event occurs 812, it is determined whether or not the put is "in the money" 814. If the put is "in the money" the purchaser of the put option will exercise the option 818 and the contract will be settled (either by cash or by delivery at the strike price, depending on the terms of the contract). If the put option is not in the money 814, and/or if a specified event does not occur 812, the contract will expire 816. If the specified event put option includes a number of different specified events (e.g., multiple policy holders, each of which may or may not choose to surrender their policies), if may be that some specified events occur and others do not. For those specified events that do occur, the put option may in the money in some cases and not in others.

Exemplary embodiments (FIG. 11) may include a computer-aided process that offers a preferred group or groups access to the use of, and/or the development of, risk-adjusted investment management models. A group (or a set of groups) may be defined as the set of entities that are party to, and/or are potential qualified parties to, an agreement and/or a potential agreement (or agreements) regarding assumption of risk. Other groups may include qualified researchers seeking to test and/or develop risk-adjusted investment management models. The access of different groups to various databases and/or models (and/or specific variations of models) may be different.

The joint development, testing and refinement process built into this exemplary embodiment may make it possible to go beyond present risk-adjusted investment models which are often closely held and backward-looking (e.g., mean-variance models) to more sophisticated, continuously improving, forward-looking models of risk that are shared among all of the participants to a transaction.

The idea of sharing investment management tools among the participants in a transaction or transactions goes against current practices in which participants seek to gain an advantage through superior knowledge and, as a result, tend to guard their knowledge and keep it secret, rather than sharing the knowledge.

Therefore, it follows that the very idea of sharing in the development and use of risk-adjusted investment models may benefit the parties to the transaction or transactions—and even the economy as a whole.

Consider the BOLI/COLI market. If all of the policyholders have access to jointly developed risk-adjusted investment models that improve their investment decision making, all of the policyholders may experience higher returns with less risk. This superior investment performance may in turn significantly reduce the risk of specified events (e.g., policyholders choosing to surrender all of their policies), which in turn may reduce the risks and losses of the providers of the desired accounting treatment, which may in turn reduce their fees, thus further increasing investment performance for the policyholders.

On a macro scale, the widespread use of this exemplary embodiment may improve the stability of financial markets and improve their functioning, thus reducing average risk (due to lower volatility) and/or increasing average returns (due to higher economic growth as a result of superior allocation of capital) for everyone.

The risk-adjusted investment management models may build on, incorporate and/or interact with the risk models that are another exemplary embodiment.

The joint development, testing and refinement of risk-adjusted investment management models on an ongoing basis may result in significant improvements in our ability to estimate expected returns (as well as risk) as compared to present methodologies.

Present methodologies for estimating expected returns tend to be backward-looking—projecting recent performance into the future. Consider expected earnings growth, which is often a major component of expected returns on stocks. For most of the current decade, earnings grew at double digit rates—much faster than the economy. This double digit growth in earnings was widely expected to continue into the indefinite future—ignoring the fact that earnings cannot continue to grow faster than the economy indefinitely because that may require earnings at some point to become larger than the economy, which is clearly not possible. In fact, earnings have reached an historic high as a percentage of GDP and, therefore, based on the experience of reversion to the mean, earnings growth slower than (as opposed to faster than) the economy may well be the most likely result—which implies much slower growth in earnings and likely lower returns on stocks.

This exemplary embodiment provides a process for developing, testing, implementing and refining more sophisticated, forward-looking models for estimating expected returns as a component of the shared and jointly developed risk-adjusted investment management models. The result may be improved pricing of investments and, therefore, a more stable, lower financial and economic system with a lower cost of capital and higher, more stable growth.

The models developed using this process may incorporate the ideas and computer modeling technologies that have been developed by the new sciences that investigate the dynamic properties of systems, including: 1) non-linear dynamic systems (chaos theory); 2) emergence (complexity); and/or, 3) the science of networks.

FIG. 11 illustrates a possible implementation of this exemplary embodiment. The exemplary embodiment presented in FIG. 11 may be implemented on at least one processing apparatus. The processing apparatus(es) may be associated with one or more of the entities depicted in FIG. 1. If more than one processing apparatus is implementing the embodiment, the processing apparatuses may work interdependently, independently, or some combination of both.

A home page 900 offers visitors to the web site a number of choices, including a member log-in, an application for membership, and access to information open to the public. Member log-in may require the use of a password and/or other processes for maintaining security. There may be a number of classes of memberships and access to data and other information may be restricted by class of membership and/or the particulars of a member's activities.

Those seeking membership may be required to supply information 902 and submit it 904 for further action. After logging in, members may choose from a number of options 906 including risk-adjusted investment models and model testing and development. Members may choose to access information on the components of investment management, including expected returns, risk, and the terms and fees associated with various investment choices 908. They may then choose to move on to integrated risk-adjusted investment management models 910.

After choosing a model, members may be guided to input the relevant data 912, be provided links to relevant databases, and may output 916 the model's results. Members selecting 906 model testing and development may be provided links to information on expected returns, risk and terms and fees associated with various investment choices 908, access to the risk-adjusted investment management models currently available 910, access to relevant databases 914, access to research results 918, access to statistical methodologies and tools 920, and/or access to discussion groups for past and ongoing research 922. Still another exemplary embodiment (FIG. 12) is a computerized configuration to implement at least one agreement governing an entity in which at least two parties have contributed permanent life insurance policies to the entity in exchange for ownership interests in the entity. In such an embodiment the parties can: 1) exchange low-performing bank-owned life insurance/corporate-owned life insurance (BOLI/COLI) for higher-performing policies while; 2) improve policy pricing and carrier terms and reduce costs by creating economies of scale; and/or 3) reduce the risks faced by stable value protection (SVP) providers and other providers of the desired accounting treatment, etc. (e.g., at least one other class of ownership interest, issuers of specified event bonds, etc.), thereby improving the pricing and terms for the parties.

In addition to establishing agreements and processes among the parties that can reduce the risks faced by the SVP providers, the embodiment can further reduce the risks faced by the SVP providers by establishing reserves (funded by the parties) that can further reduce the risks faced by the SVP providers (e.g., by absorbing first dollar losses). It may be possible for the entity to, at some point, become fully self-insured with regard to the provision of SVP. Reserves can be held within the policies, thus making the returns of the reserves tax-free.

In yet another variation of this embodiment, the pension funds associated with one or more of the parties can provide SVP by purchasing an other class of ownership interest in an investment fund (or in the entity), thus receiving fee income from the provision of SVP, increasing the return on the other class of ownership interest and capturing (tax-free) the consideration from providing SVP.

A computer implementation of such an embodiment can be carried out in a number of variations, as may be desired for one application or another. Illustratively, the entity ownership of contributed policies can be exemplified as a method of using an apparatus, the method including: 1) storing in memory 52 terms of an agreement governing an entity in which a plurality of parties have contributed permanent life insurance policies to the entity in exchange for ownership interests in the entity; 2) determining, by a digital computer accessing the memory 52 and receiving policy cash value data, an allocation of entity ownership among the parties (e.g., in the form of capital accounts), and storing the allocation in the memory 52; 3) determining, by the computer accessing the memory 52 and receiving data corresponding to policy cash values, policy death benefits and entity assets and liabilities, an allocation of entity profits and losses among the parties, an allocation of income among the parties, an allocation of expenses among the parties and an allocation of changes in entity assets among the parties that occur from one specified point in time to another, and storing said allocations in the memory 52; 4) determining, by the computer accessing the memory 52, an accounting of entity, income, expenses, assets, and liabilities; 5) outputting, by the computer, the accounting. Apparatus (including system) and article implementations can also be used.

Such an embodiment can be used to provide entity parties (e.g., entity parties could be partners in a partnership or members of a limited liability company) the ability to obtain substantially improved performance of existing policies. For example, contributed policies, with exposure to at least one undesirable insurance company (e.g., recently downgraded or providing inferior service) could be effectively (i.e., via the entity) exchanged for replacement policies that conform to pre-defined terms of the entity agreement (e.g., specifying minimum issuing carrier financial strength or policy structure, e.g., separate account, minimum service standards).

Likewise, policies that are deemed to underperform due to low crediting rates on policy cash values, or due to excessive loads could be exchanged for more desirable policies. Yet other possible improvements to be garnered from such an embodiment include more explicit policy pricing and more substantive and favorable terms. In all these instances, such improvements may result from the combined purchasing power of the parties concentrated within an entity. If such improvements are to be achieved via exchanging contributed policies for replacement policies, an embodiment might be used to determine, from the stored policy cash value data, whether policy expenses are in accordance with the terms of the agreement and/or whether the terms of the agreement provide stable value protection for the contributed permanent life insurance policies.

Depending upon the desired implementation of replacement of contributed policies, the timing of receipt of policy cash value by an insurance company issuing replacement policies (note that the replacing insurer might be the same as the original issuing insurance company or a different insurance company) could have economic repercussions, which if not monitored could result in unintended or unwanted effects on selected parties. Therefore through a computer storing terms of an agreement, policy cash value data could include the timing and amount of the cash surrender value as it is actually received by insurance companies issuing replacement policies. Possible computational methods of allocating such economic repercussions of timing differences include but are not limited to 1) determining a special allocation among the parties; 2) using a special expense allocation determining an amortization schedule; 3) determine an adjustment to entity ownership among the parties; 4) determine an adjustment to an allocation of profit and loss among the parties: 5) determine an adjustment to income allocated among the parties.

Depending on the desired implementation improvements in pricing, structure, terms etc. might make it desirable for an allocation of entity profits and losses among the parties, an allocation of income among the parties, and an allocation of changes in entity assets among the parties that occur from one specified point in time to another.

Variations in implementation can be carried out, for example, computing, reconciling and outputting allocations of entity profits and losses among the parties, allocations of income among the parties, and allocations of changes in entity assets among the parties that occur from one specified point in time to another.

Yet other variations, depending upon the desired embodiment, might dictate the allocation of expenses among the parties, when such expenses include an allocation of policy expenses and/or entity expenses. Examples of such expenses include, but are not limited to, loan interest (in connection with borrowings internal or external to policies), entity level administrative services, accounting, legal, investment management, consulting and auditing related expenses as well as policy expenses, including, but not limited to M&E charges, retention, COI, recordkeeping, custodial fees, policy administration, commissions, state levied premium related taxes and federal deferred acquisition costs (DAC) taxes.

With respect to the above referenced premium taxes incurred in connection with certain exchanges, in yet another possible embodiment unique to an entity having received contributed policies from a plurality of parties, it may be desirable for the policy cash value data or entity data to include an amount of state premium tax paid in connection with replacement policies whereby the premium tax cost can be traced back to the contributor of the original policy so that differences in premium tax rates from jurisdiction to jurisdiction can be allocated among parties in an agreeable manner (i.e., to avoid one party subsidizing the higher incurred cost of others). Possible computational methods of allocating such costs include, but are not limited to 1) determining a special allocation among the parties; 2) using a special expense allocation to each of the parties and thereby determining a corresponding premium tax amortization schedule; 3) determine an adjustment to entity ownership among the parties; 4) determine an adjustment to an allocation of profit and loss among the parties: 5) determine an adjustment to income allocated among the parties.

Because profits and losses for certain entities, including partnerships and certain limited liability companies may be determined in a manner quite different than any of its owners (the parties contributing policies in exchange for an ownership interest therein), it may be desired to determine the allocation of entity profits and losses among the parties when cash flows are received and/or are distributed by the entity to its parties. Examples of cash flows which might, depending upon the desired embodiment, require an allocation of profits and losses among the parties, include, but are not limited to death claims, policy rescissions, DAC refunds (i.e., when paid in cash), policy loans policy surrenders, policy cash value withdrawals, policy dividends, experience rating refund/credits (if paid in cash) and partial policy surrenders. Similarly, depending upon the preferred embodiment, allocations of entity income or the growth of entity assets might involve determining, from the stored policy cash value data and stored entity assets data, including data regarding changes in the market value or contract value from period to period, including changes in mortality reserves, DAC assets, cash, death claims and premiums paid.

Another variation of computing according to the terms of an entity agreement might arise in connection with events which are difficult, if not impossible, to predict in advance. Examples of such events include but are not limited to 1) situations where one of the contributing parties must rescind all or a portion of its ownership interest in the entity (e.g., due to regulatory intervention or due failure to fulfill its representations and warranties); 2) the party that contributed certain policies failed to fulfill statutory requirements at the time of original purchase; 3) the party that originally contributed policies is or would have been subject to a legal or regulatory action as a consequence of such purchase or ownership; and 4) situations in which policies must be rescinded or surrendered, even in some instances, shortly after they were contributed (e.g., as instructed by the insured, which is an ongoing requirement in certain situations). Accordingly, in these and other situations, an exemplary embodiment might include (but not be limited to) the ability to, accordance with the terms of the agreement 1) determine an amount of reimbursement of entity expenses to a rescinding party and adjusting expense allocations for each of the parties; 2) in connection with rescinded policies, computing a reimbursement allocation to the contributing party and adjusting expense allocations for each party; 3) using data including an amount of profit or loss for surrendered policies to be allocated to the respective the parties which contributed the policies, and adjusting expense allocations for each of the parties; 4) using data including an amount of profit or loss for surrendered policies to be allocated to the respective parties which contributed the policies, and adjusting expense allocations for each of the parties in accordance with the terms of the agreement by determining a special allocation of expense to the respective parties for legal expenses incurred in connection with the contributed policies; 5) determining an entity ownership reduction. allocated among the parties for surrendered policies.

From another perspective, there can be a computer readable medium storing executable instructions, which when retrieved and executed on a digital computer, causes the digital electrical computer to perform the operations of: storing in memory 52, operably associated with the computer, data specifying an agreement by which special administrative duties can be performed on behalf of an entity and its owners/parties in which permanent policies have been contributed in exchange for an interest in the entity and whereby subsequent to such contributed policies are contributed, improvements are attained on a collective basis (i.e., using the combined purchasing power to either exchange policies for improved replacement policies or using the credible threat of an exchange to achieve other desired ends, including improvements to existing policies, conversions to more suitable policies or assumption reinsurance). In such circumstances, various embodiments might include the ability to perform, in accordance with the terms of the agreement, ongoing administrative, record keeping and reporting functions including, but not limited to 1) determining an entity ownership reduction allocated among the parties subsequent to the surrender of policies; 2) adjustments to entity cost basis and to entity ownership, and allocating the cost basis and the entity ownership (e.g., in the form of changes/adjustments to capital accounts) among the parties in connection with policy death claims; 3) computing and/or re-computing adjusted current earnings for each of the policies and an allocation of the adjusted current earnings for each of the parties; 4) projecting future cash in-flows from policies, and, computing an apportionment of such projected cash-flows among the parties (and possibly integrating such projections and apportionments with other projected cash inflows from other policies each party owns, i.e., external to a given entity, and further to that, integrating various projected cash-inflows with projected cash outflows stemming from employee benefit plans and/or employee compensation arrangements and possibly analyzing the relationship of projected inflows to projected outflows, including the net present value of such inflows and outflows); 5) determining adjustments to an entity cost basis and to entity ownership, and allocating the cost basis and the ownership interest among the parties due to at least one of the parties liquidating an ownership interest in the entity; 6)

adjustments to an entity cost basis and to entity ownership, and allocating the cost basis and the ownership interest among the parties due to at least one of the parties having contributed at least one additional policy (e.g., as a consequence of wanting to increase existing ownership in the entity or in instances when a new party acquires an interest in the entity); 7) determining loan interest and allocations for said loan interest among the parties; 8) determining the risk weights of entity assets (e.g., according to Basel I, II or III or according to other bank or insurer regulatory edicts); 9) determining a market value of entity assets and a contract value of entity assets and determining an allocation of the market value and the contract value among the parties (possibly including the relationship of one to the other); 10) determining adjustments (both one time and ongoing) to all of the above when one or more new parties purchase an ownership interest from an existing party or when one or more existing entity owners/parties purchase all or a portion of the ownership interest of one or more existing owners/parties).

In yet another exemplary implementation, it may be desirable for parties to achieve pre-specified asset diversification goals, asset risk weight goals or diversification of investment manager goals (e.g., to fulfill mandates of a stable value provider(s) or regulatory guidelines). As such, depending on the implementation preferred for the particular circumstances of the implementation, it may be desired to determine whether the policy cash values are allocated among available separate account divisions in accordance with the terms of the agreement.

In another implementation, parties might contribute policies to an entity in exchange for an ownership interest in order to obtain stable (i.e., less volatile) accounting. This could be achieved because the risks borne by the provider of stable value protection (traditional or via alternative structure, e.g., bond or share class) could be mitigated in ways not possible when stable value is provided to a traditional policyholder (i.e., although a single entity owns the policies, a plurality of parties might provide representations or provide warranties or present circumstances that are collectively more favorable). Thus, in instances where the policies perform well and are otherwise acceptable but what is lacking is more stable accounting of policy values, no exchange or replacement of contributed policies may be desired or pursued, yet policies would still be contributed to a single entity by a plurality of parties in exchange for an ownership interest in the entity.

In yet a further variation of attaining stable value accounting, conventional accounting available for a particular form or type of entity (e.g., the terms of the agreement comprise terms of an agreement governing a partnership, and the parties are partners of the partnership or the terms of the agreement comprise terms of an agreement governing a limited liability company, and the parties are members of the limited liability company) might suffice in and of itself without the need to purchase protection, smoothing amortization, etc. from a stable value provider or similar party. For example, certain costs, such as premium tax, that would normally be expensed immediately by a policyholder (unless shifted in some fashion to another party) might be amortizable under available partnership accounting methods, thereby eliminating the need to incur the cost normally attendant to compensating the insurance company or a provider of stable value protection. It may be possible to apportion, via accepted accounting practice, stable accounting to specified parties with less stable accounting to other parties.

FIG. 12 is a flow chart of an illustrative embodiment. In FIG. 12 there is a storing in memory 52 terms of an agreement governing an entity in which at least two parties have contributed permanent life insurance policies to the entity in exchange for ownership interests in the entity 1000. Determining, by a digital computer accessing the memory 52 and receiving policy cash surrender value data, an allocation of entity ownership among the parties, and storing the allocation in the memory (52) 1002. Determining, by the computer accessing the memory 52 and receiving data corresponding to policy cash values, policy death benefits and entity assets and liabilities, an allocation of entity profits and losses among the parties, an allocation of income among the parties, an allocation of expenses among the parties and an allocation of changes in entity assets among the parties that occur from one specified point in time to another, and storing said allocations in the memory (52) 1004. Determining, by the computer accessing the memory 52, an accounting of entity, income, expenses, assets, and liabilities 1006. Outputting, by the computer, the accounting 1008.

Yet another exemplary embodiment (FIG. 13) is a computer-aided process for determining, on a security-by-security basis the applicable exposure category and computing the corresponding risk-based capital requirement under the Risk-Based Capital Guidelines; Capital Adequacy Guidelines; Standardized Framework and/or the Advanced Approaches (Basel II).

The system may apply this process to all of the securities held in (and/or being considered for possible purchase) a portfolio and/or portfolios of securities owned directly and/or indirectly (e.g., through ownership of BOLD. The process may use the risk-based capital requirement determined by the process to estimate expected return and/or Net Present Value that the institution may expect to receive from holding the security, adjusted for its risk-based capital requirement and/or portfolio risk.

FIG. 13 illustrates a possible implementation of this exemplary embodiment. The exemplary embodiment presented in FIG. 13 may be implemented on at least one processing apparatus. The processing apparatus(es) may be associated with one or more of the entities depicted in FIG. 1. If more than one processing apparatus is implementing the embodiment, the processing apparatuses may work interdependently, independently, or some combination of both.

Identifying data for the security is entered 1100 into the system. The system retrieves available information 1102 regarding exposure categories and credit risk from internal and/or external sources.

The system then determines the exposure category and credit risk 1104 under the preferred Guidelines. The system then determines the risk-based capital requirement 1106 under the preferred Guidelines.

The system retrieves current market information regarding returns on securities and risk 1108 from internal and/or external sources. The system then determines: 1) the current cost of capital 1110 for the institution (note that if a current cost of capital is available, the system may retrieve it rather than repeating a former step of determining the current cost of capital); 2) the portfolio risk of the security 1112 relative to a preferred portfolio (e.g., the total portfolio of securities held by the institution and/or a preferred sub-portfolio); and/or 3) the return and/or Net Present Value that the institution can expect on the security, adjusted for its risk-based capital requirement and/or its portfolio risk 1114.

The output of this exemplary embodiment (1114) may be utilized as input data (912) in the risk-adjusted investment model exemplary embodiment (FIG. 11).

Still another exemplary embodiment (FIG. 14) is a computer-aided process for rewriting a general account policy (or a specified set of general account policies) into a hybrid separate account policy (or policies), thus reducing the exposure of the policyholder to carrier insolvency risk while providing the opportunity to improve policy performance.

FIG. 14 illustrates a possible implementation of this exemplary embodiment. The exemplary embodiment presented in FIG. 14 may be implemented on at least one processing apparatus. The processing apparatus(es) may be associated with one or more of the entities depicted in FIG. 1. If more than one processing apparatus is implementing the embodiment, the processing apparatuses may work interdependently, independently, or some combination of both.

Data regarding the general account policy (or policies) is entered 1200 into the system. The system retrieves 1202 data regarding general account assets. The system determines 1204 if assets (in the general account that are funding the policy or policies) can be segregated on a non-discriminatory basis.

If yes, the system moves 1206 the specified assets to a separate account and rewrites 1210 the general account policy (or policies) into a hybrid separate account policy (or policies).

If no, the system establishes the desired separate account 1208, populates it with a mix of general account assets (on a pro-rata basis), short-term assets, or a mix of each and enters into a swap arrangement whereby the returns on the separate account assets are swapped for the return in the general account assets minus a spread. The system then rewrites 1210 the general account policy (or policies) into a hybrid separate account policy (or policies).

According to one aspect, all or a portion of the system, such as all or portions of the providers of the desired accounting treatment, etc. 2, purchasers of the desired accounting treatment, etc. (policyholders and/or protection buyers) 14, insurance companies 8, investment managers 20, investment bankers 4, exchanges and/or trading networks for securities 6, reporting companies (e.g., Bloomberg, Reuters, etc.) 10, brokers (e.g., securities brokers, insurance brokers, etc.) 12, rating companies (e.g., Standard & Poor, Moody's, Fitch, A. M. Best, etc.) 24, regulators (e.g., SEC, state insurance commissioners, etc.) 22, administrators (e.g., of partnerships or other entities) 18, and/or third party providers of computer services (including so-called "cloud computing" in which the programs and/or data reside on the web) 16, generally operates under control of a computer program product. The computer program product for performing the methods of embodiments includes a computer-readable storage medium, such as the non-volatile storage medium, and computer-readable program code portions, such as a series of computer instructions, embodied in the computer-readable storage medium.

In this regard, FIGS. 3, 4, 5, 6, 6A, 7, 8, 9, 10, 11, 12, 13 and 14 are flowcharts of methods, systems and computer program products according to illustrative embodiments. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the block(s) or step(s) of the flowcharts. These computer program instructions may also be stored in a computer-readable memory (medium) that can direct a computer or other programmable apparatus to function in a particular manner, such that the instructions stored in the computer-readable memory produce an article of manufacture including instruction means which implement the function specified in the block(s) or step(s) of the flowcharts. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block(s) or step(s) of the flowcharts.

Accordingly, blocks or steps of the flowcharts support combinations of means for performing the specified functions, combinations of steps for performing the specified functions and program instruction means for performing the specified functions. It will also be understood that each block or step of the flowcharts, and combinations of blocks or steps in the flowcharts, can be implemented by special purpose hardware-based processing apparatuses which perform the specified functions or steps, or combinations of special purpose hardware and computer instructions.

In sum, appreciation is requested for the robust range of possibilities flowing from the core teaching herein. More broadly, however, the terms and expressions which have been employed herein are used as terms of teaching and not of limitation, and there is no intention, in the use of such terms and expressions, of excluding equivalents of the features shown and described, or portions thereof, it being recognized that various modifications are possible within the scope of the embodiments contemplated and suggested herein. Further, various embodiments are as described and suggested herein. Although the disclosure herein has been described with reference to specific embodiments, the disclosures are intended to be illustrative and are not intended to be limiting. Various modifications and applications may occur to those skilled in the art without departing from the true spirit and scope defined in the appended claims.

Thus, although only a few exemplary embodiments have been described in detail above, it is respectfully requested that appreciation be given for the modifications that can be made based on the exemplary embodiments, implementations, and variations, without materially departing from the novel teachings and advantages herein. Accordingly, such modifications are intended to be included within the scope defined by claims. In the claims, and otherwise herein, means-plus-function language is intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment fastening wooden parts, a nail and a screw may be equivalent structures.

Although specific terms are employed herein, they are used in a generic and descriptive sense only and not for purposes of limitation.

We claim:

1. A method of using an apparatus, the method including:
storing in memory data specifying an agreement by which a first investment that is a first class of ownership interest in an entity is obligated to pay consideration to at least one other investment that is at least one other class of ownership interest in the entity or another entity in exchange for the at least one other investment that is at least one other class of ownership interest incurring risk exposure to at least one specified risk associated with the first investment that is the first class of ownership interest and whereby realizing a loss associated with the risk exposure is contingent upon occurrence of at least one specified event;

determining, by a digital computer from the data specifying the agreement in the memory, and from market data corresponding to the first investment that is the first class of ownership interest, an amount of the risk exposure associated with the at least one other investment that is the at least one other class of ownership interest and an amount of the consideration to be paid by the first investment that is the first class of ownership interest; and outputting, by the computer, at least one of the amounts.

2. The method of claim 1, wherein the determining reflects that the agreement is such that the at least one other class of ownership interest comprises at least two other classes of ownership interest.

3. The method of claim 1, further including:

receiving data corresponding to the occurrence, and determining from the data corresponding to the occurrence whether the occurrence has occurred, and if the occurrence has occurred, determining an amount of the loss; and outputting the amount of the loss.

4. The method of claim 1, wherein the determining reflects that the agreement is such that the at least one specified risk includes at least one of an interest rate risk, a price risk, a liquidity risk, an inflation risk, a credit risk, a currency risk, and a benefit guarantee risk.

5. The method of claim 1, wherein the determining reflects that the agreement is such that the first class of ownership interest and the at least one other class of ownership interest are different classes of ownership in the same entity.

6. The method of claim 1, wherein the determining reflects that the agreement is such that the first class of ownership interest and the at least one other class of ownership interest are classes of ownership in different entities.

7. The method of claim 1, wherein the determining reflects that the agreement is such that the first class of ownership interest is one of more than one class of ownership interest in a partnership.

8. The method of claim 1, wherein the determining reflects that the agreement is such that the first class of ownership interest is an interest in a partnership, and the partnership has only one class of ownership interest in the partnership.

9. The method of claim 1, wherein the determining reflects that the agreement is such that the first class of ownership interest in the entity is one of more than one class of ownership interest in a limited liability company.

10. The method of claim 1, wherein the determining reflects that the agreement is such that the first class of ownership interest in the entity is an interest in a limited liability company, and the limited liability company has only one class of ownership interest in the limited liability company.

11. The method of claim 1, wherein the determining reflects that the agreement is such that the first class of ownership in the entity interest is one of more than one class of ownership interest in an investment fund.

12. The method of claim 1, wherein the determining reflects that the agreement is such that the first class of ownership interest in the entity is an ownership interest in an investment fund, and the investment fund has only one class of ownership interest in the investment fund.

13. The method of either claim 11 or 12, wherein the investment fund is an investment fund registered with the SEC.

14. The method of either claim 11 or 12, wherein the investment fund is an investment fund not registered with the SEC.

15. The method of either claim 11 or 12, wherein the investment fund is a closed-end fund.

16. The method of either claim 11 or 12, wherein the investment fund is an open-end fund.

17. The method of either claim 11 or 12, wherein the investment fund is an exchange-traded fund.

18. The method of either claim 11 or 12, wherein the investment fund is a hedge fund.

19. The method of claim 1, wherein the determining reflects that the agreement is such that the first class of ownership interest in the entity is a class of ownership interest in an investment division of a separate account of an insurance company.

20. The method of claim 1, wherein the determining reflects that the agreement is such that the first class of ownership interest in the entity is an ownership interest in a separate account insurance policy.

21. The method of claim 1, wherein the determining reflects that the agreement is such that the first class of ownership interest in the entity is an ownership interest within a retirement plan.

22. The method of claim 21, wherein the retirement plan includes an elective deferral provision.

23. The method of claim 21, wherein the retirement plan is a defined-contribution pension plan.

24. The method of claim 21, wherein the retirement plan is a defined-benefit pension plan.

25. The method of claim 21, wherein the retirement plan is a cash-balance pension plan.

26. The method of claim 21, wherein the retirement plan is an IRA.

27. The method of claim 21, wherein the retirement plan is a Roth IRA.

28. The method of claim 1, wherein the determining reflects that the agreement is such that the first class of ownership interest in the entity is an ownership interest within a profit sharing plan.

29. The method of claim 28, wherein the determining reflects that the agreement is such that the first class of ownership interest in the entity is an ownership interest within a profit sharing plan in which there is an elective deferral provision.

30. The method of claim 1, wherein the determining reflects that the agreement is such that the first class of ownership interest in the entity is an ownership interest within an employee stock ownership plan (ESOP).

31. The method of claim 30, wherein the determining reflects that the agreement is such that the first class of ownership interest in the entity is an ownership interest within an employee stock ownership plan (ESOP) in which there is an elective deferral provision.

32. The method of claim 1, wherein the determining reflects that the agreement is such that the at least one other class of ownership interest in the entity or the other entity is one of more than one class of ownership interest in a partnership.

33. The method of claim 1, wherein the determining reflects that the agreement is such that the at least one other class of ownership interest in the entity or the other entity is an interest in a partnership, and the partnership has only one class of ownership interest in the partnership.

34. The method of claim 1, wherein the determining reflects that the agreement is such that the at least one other class of ownership interest in the entity or the other entity is one of more than one class of ownership interest in a limited liability company.

35. The method of claim 1, wherein the agreement is such that the at least one other class of ownership interest in the entity or the other entity is an interest in a limited liability company, and the limited liability company has only one class of ownership interest in the limited liability company.

36. The method of claim 1, wherein the determining reflects that the agreement is such that the at least one other class of ownership interest in the entity or the other entity is one of more than one class of ownership interest in an investment fund.

37. The method of claim 1, wherein the determining reflects that the agreement is such that the at least one other class of ownership interest in the entity or the other entity is an interest in an investment fund, and the investment fund has only one class of ownership interest in the investment fund.

38. The method of either claim 36 or 37, wherein the investment fund is an investment fund registered with the SEC.

39. The method of either claim 36 or 37, wherein the investment fund is not registered with the SEC.

40. The method of either claim 36 or 37, wherein the investment fund is a closed-end fund.

41. The method of either claim 36 or 37, wherein the investment fund is an open-end fund.

42. The method of either claim 36 or 37, wherein the investment fund is an exchange-traded fund.

43. The method of either claim 36 or 37, wherein the investment fund is a hedge fund.

44. The method of claim 1, wherein the determining reflects that the agreement is such that the at least one other class of ownership interest in the entity or the other entity is a class of ownership interest in an investment division of a separate account of an insurance company.

45. The method of claim 1, wherein the determining reflects that the agreement is such that the at least one other class of ownership interest in the entity or the other entity is an ownership interest in a separate account insurance policy.

46. The method of claim 1, wherein the determining reflects that the agreement is such that the at least one other class of ownership interest in the entity or the other entity is an ownership interest within a retirement plan.

47. The method of claim 46, wherein the retirement plan includes an elective deferral provision.

48. The method of claim 46, wherein the retirement plan is a defined-contribution pension plan.

49. The method of claim 46, wherein the retirement plan is a defined-benefit pension plan.

50. The method of claim 46, wherein the retirement plan is a cash-balance pension plan.

51. The method of claim 46, wherein the retirement plan is an IRA.

52. The method of claim 46, wherein the retirement plan is a Roth IRA.

53. The method of claim 1, wherein the determining reflects that the agreement is such that the at least one other class of ownership interest in the entity or the other entity is an ownership interest within a profit sharing plan.

54. The method of claim 53, wherein the determining reflects that the agreement is such that the at least one other class of ownership interest in the entity or the other entity is an ownership interest within a profit sharing plan in which there is an elective deferral provision.

55. The method of claim 1, wherein the determining reflects that the agreement is such that the at least one other class of ownership interest in the entity or the other entity is an ownership interest within an employee stock ownership plan (ESOP).

56. The method of claim 1, wherein the determining reflects that the agreement is such that the at least one other class of ownership interest in the entity or the other entity is an ownership interest within an employee stock ownership plan (ESOP) in which there is an elective deferral provision.

57. The method of claim 1, wherein the determining reflects that the agreement is such that the first class of ownership interest is a class of ownership interest in a partnership and the at least one other class of ownership interest is an other class of ownership interest in the partnership.

58. The method of claim 1, wherein the determining reflects that the agreement is such that the first class ownership interest is a class of ownership interest in an investment fund and the at least one other class of ownership interest is an other class of ownership interest in the investment fund.

59. The method of claim 1, wherein the determining reflects that the agreement is such that the first class of ownership interest in the entity is an ownership interest in at least one marketable security.

60. The method of claim 1, wherein the determining reflects that the agreement is such that the at least one other class of ownership interest in the entity or the other entity is an ownership interest in at least one marketable security.

61. The method of claim 1, wherein the determining reflects that the agreement is such that the at least one specified risk is an interest rate risk associated with the first class of ownership interest in the entity.

62. The method of claim 1, wherein the determining reflects that the agreement is such that the at least one specified risk is a credit risk associated with the first class of ownership interest in the entity.

63. The method of claim 1, wherein the determining reflects that the agreement is such that the at least one specified risk is a price risk associated with the first class of ownership interest in the entity.

64. The method of claim 1, wherein the determining reflects that the agreement is such that the at least one specified risk is a liquidity risk associated with the first class of ownership interest in the entity.

65. The method of claim 1, wherein the determining reflects that the agreement is such that the at least one specified risk is an inflation risk associated with the first class of ownership interest in the entity.

66. The method of claim 1, wherein the determining reflects that the agreement is such that the at least one specified risk is a currency risk associated with the first class of ownership interest in the entity.

67. The method of claim 1, wherein the determining reflects that the agreement is such that the at least one specified risk is a Guaranteed Minimum Accumulation Benefit embedded in the first class of ownership interest in the entity and wherein, the first class of ownership interest in the entity is an ownership interest in a deferred annuity.

68. The method of claim 1, wherein the determining reflects that the agreement is such that the at least one specified risk is a Guaranteed Minimum Death Benefit embedded in the first class of ownership interest in the entity and wherein, the first class of ownership interest in the entity is an ownership interest in a deferred annuity.

69. The method of claim 1, wherein the determining reflects that the agreement is such that the at least one specified risk is a Guaranteed Minimum Income Benefit embedded in the first ownership interest and wherein, the first class of ownership interest in the entity is an ownership interest in an annuity.

70. The method of claim 1, wherein the determining reflects that the agreement is such that the at least one specified risk is a Guaranteed Minimum Withdrawal Benefit embedded in the first class of ownership interest in the entity and wherein, the first class of ownership interest in the entity is an ownership interest in an annuity.

71. The method of claim 1, wherein the determining reflects that the agreement is such that the at least one specified risk is a Guaranteed Minimum Purchasing Power Benefit embedded in the first class of ownership interest in the entity and wherein, the first class of ownership interest in the entity is an ownership interest in an annuity.

72. The method of claim 1, wherein the determining reflects that the agreement is such that the at least one specified event is a qualifying surrender of an insurance contract.

73. The method of claim 1, wherein the determining reflects that the agreement is such that the at least one specified event is a withdrawal event from a stable value fund.

74. The method of claim 73, wherein the withdrawal event is a net withdrawal from the stable value fund.

75. The method of claim 73, wherein the withdrawal event is a net withdrawal in excess of the market value of the assets of the stable value fund.

76. The method of claim 1, further including storing a stable value process; and wherein the determining of at least one of the amounts includes implementing the stable value process.

77. The method of claim 76, further including implementing the stable value process in determining at least one of a stable value return and a contract value of the first class of ownership interest.

78. The method of claim 77, wherein the determining the amount of the at least one specified risk includes calculating the difference between contract value and market value of the first ownership interest.

79. The method of claim 2, wherein the determining reflects that the at least two other classes of ownership interest are different classes of ownership interest in the same entity.

80. The method of claim 2, wherein the determining reflects that the at least two other classes of ownership interest are classes of ownership interest in different entities.

81. The method of claim 2, wherein the determining reflects that the at least one other class of ownership interest comprises at least two other classes of the ownership interest, and the first class of ownership interest is obligated to pay compensation to each of the at least two other classes of ownership interest in return for each of the at least two other classes of ownership interest incurring the risk exposure.

82. The method of claim 81, wherein risk exposure corresponds to a respective risk exposure for each of the at least two other classes of the ownership and is within a category of risk exposure, the category specified by the agreement, and the risk exposure of each of the at least two other classes of ownership interest are in the category of risk exposure.

83. The method of claim 82, wherein the respective risk exposures represent discrete tiers of risk.

84. The method of claim 81, wherein risk exposure corresponds to a respective risk exposure for each of the at least two other classes of the ownership and each of the respective risk exposures being in a respective category of risk exposure, the categories specified by the agreement.

85. The method of any one of claims 82-84, wherein the specified event is within a variety of specified events, the variety specified by the agreement, and wherein each of the respective risk exposures is contingent on the variety of specified events.

86. The method of any one of claims 82-84, wherein the specified event is within one of a plurality of varieties of specified events, the varieties specified by the agreement, and wherein each of the respective risk exposures is contingent on a different one of the varieties of specified events.

87. An apparatus including:
  memory storing data specifying an agreement by which a first investment that is a first class of ownership interest in an entity is obligated to pay consideration to at least one other investment that is at least one other class of ownership interest in the entity or another entity in exchange for the at least one other investment that is at least one other class of ownership interest incurring risk exposure to at least one specified risk associated with the first investment that is the first class of ownership interest and whereby realizing a loss associated with the risk exposure is contingent upon occurrence of at least one specified event;
  a digital computer determining from the data specifying the agreement in the memory, and from market data corresponding to the first investment that is the first class of ownership interest, an amount of the risk exposure associated with the at least one other investment that is at least one other class of ownership interest and an amount of the consideration to be paid by the first investment that is the first class of ownership interest; and
  an output device, operably associated with the computer, outputting at least one of the amounts.

88. The apparatus of claim 87, further including a second computer interacting with the digital computer, in carrying out the agreement.

89. The apparatus of claim 87, further including a second computer exercising control and over said apparatus, so as to benefit from said control.

90. A non-transitory computer readable medium storing executable instructions, which when retrieved and executed on a digital computer, causes the digital electrical computer to perform the operations of:
  storing in memory, operably associated with the computer, data specifying an agreement by which a first investment that is a first class of ownership interest in an entity is obligated to pay consideration to at least one other investment that is at least one other class of ownership interest in the entity or another entity in exchange for the at least one other investment that is at least one other class of ownership interest incurring risk exposure to at least one specified risk associated with the first investment that is the first class of ownership interest and whereby realizing a loss associated with the risk exposure is contingent upon occurrence of at least one specified event;
  determining, from the data specifying the agreement in the memory and from market data corresponding to the first investment that is the first class of ownership interest, an amount of the risk exposure associated with the at least one other investment that is at least one other class of ownership interest and an amount of the consideration to be paid by the first investment that is the first class of ownership interest; and
  outputting at least one of the amounts.

91. The medium of claim 90, wherein the medium comprises at least one of a RAM, a ROM, a disk, an ASIC, and a PROM.

* * * * *